United States Patent [19]

Leach et al.

[11] Patent Number: 5,179,689
[45] Date of Patent: Jan. 12, 1993

[54] DATAPROCESSING DEVICE WITH INSTRUCTION CACHE

[75] Inventors: Jerald G. Leach, Houston; L. Ray Simar, Jr., Richmond, both of Tex.

[73] Assignee: Texas Instruments Incorporated, Dallas, Tex.

[21] Appl. No.: 550,231

[22] Filed: Jul. 10, 1990

Related U.S. Application Data

[63] Continuation of Ser. No. 25,756, Mar. 13, 1987, abandoned.

[51] Int. Cl.$^5$ .............. G06F 12/00; G06F 13/40
[52] U.S. Cl. .............. 395/425; 395/775; 364/243.42; 364/DIG. 1; 364/DIG. 2
[58] Field of Search ... 364/200 MS File, 900 MS File

[56] References Cited

U.S. PATENT DOCUMENTS

| | | | |
|---|---|---|---|
| 3,757,306 | 9/1973 | Boone | 340/172.5 |
| 4,074,351 | 2/1978 | Boone et al. | 364/200 |
| 4,096,567 | 6/1978 | Millard et al. | 364/200 |
| 4,481,573 | 11/1984 | Fukunaga et al. | 364/200 |
| 4,527,237 | 7/1985 | Frieder et al. | 364/200 |
| 4,564,900 | 1/1986 | Smitt | 364/200 |
| 4,577,282 | 3/1986 | Caudel et al. | 364/200 |
| 4,620,275 | 10/1986 | Wallach et al. | 364/200 |
| 4,701,844 | 10/1987 | Thompson et al. | 364/200 |
| 4,719,568 | 1/1988 | Carrubba et al. | 364/200 |
| 4,896,264 | 1/1990 | Boddie | 364/200 |

OTHER PUBLICATIONS

Allen, Jonathan; Computer Architecture for Digital Signal Processing, Proceedings of the IEEE, vol. 73, No. 5, May, 1985, pp. 852-862.
DSP Microprocessor, Analog Devices, ADSP-2100, p. 1009, One Technology Way, P.O. Box 9106, Norwood, MA 02062.
Caren, Craig J. et al.; THAM 13.1: A 60 ns CMOS DSP with On-Chip Instruction Cache, 1987 IEEE International Solid State Circuit Conf., pp. 156-157 and 378-379.
Kogge, Peter M.; The Architecture of Pipelined Computers, McGraw-Hill Book Company, Hemisphere Publishing Corporation, copyright 1981, pp. 39-47.
Roesgen, J. P.; A High Performance Microprocessor for DSP Applications, ICASSP 86, Tokyo, 1986 IEEE, pp. 397-400.

*Primary Examiner*—Stuart N. Hecker
*Assistant Examiner*—Michael A. Whitfield
*Attorney, Agent, or Firm*—Robby T. Holland; René E. Grossman; Richard L. Donaldson

[57] ABSTRACT

A microcomputer is disclosed which is specifically designed for computation-intensive applications. The microcomputer contains on-chip RAM and ROM, and has peripheral ports for access of external memory and input/output functions. The microcomputer has a central processing unit with a floating-point multiplier in parallel with an arithmetic logic unit, and uses a plurality of registers as multiple accumulators. The central processing unit further contains two auxiliary arithmetic logic units, in parallel with one another, and which are each connected to a set of address lines in a memory bus; the two auxiliary arithmetic logic units thus generate two separate memory addresses in parallel. The memory bus also contains one set of data lines, connected to the RAM and ROM, and to the central processing unit. The on-chip RAM and ROM are responsive to the two sets of address lines in time-multiplexed fashion to provide memory access via data lines twice per system clock cycle. A second memory bus is also connected to the on-chip RAM and ROM, and to the peripheral ports, so that access to one of the memory elements via said first memory bus can occur simultaneously with, and independently from, access to another of said memory elements via said second memory bus. The on-chip memory and external memory are all mapped into a single memory address space, which allows simultaneous program and data fetches via the two memory buses, or a program and data fetch during the same cycle using the first time-multiplexed bus. Memory-mapped input and output functions are performed by on-chip peripherals, which are connected to a peripheral bus connected to one of the peripheral ports of the microcomputer. The peripheral bus allows for substantial flexibility relative to the configuration of the microcomputer.

21 Claims, 15 Drawing Sheets

DATAPROCESSING DEVICE WITH INSTRUCTION CACHE

This application is a continuation of application Ser. No. 025,756, filed Mar. 13, 1987, now abandoned.

This application is related to applications Ser. No. 025,417 now U.S. Pat. No. 4,912,636 (TI-11961), Ser. No. 025,443 (TI-12599), and Ser. No. 025,413 (TI-12601) all filed contemporaneously herewith.

This invention relates to data processing devices, and specifically to the architecture of single-chip microcomputers in connection with memory access.

BACKGROUND OF THE INVENTION

A microprocessor device is a central processing unit or CPU for a digital processor which is usually contained in a single semiconductor integrated circuit or "chip" fabricated by MOS/LSI technology, as shown in U.S. Pat. No. 3,757,306 issued to Gary W. Boone and assigned to Texas Instruments. The Boone patent shows a single-chip 8-bit CPU including a parallel ALU, registers for data and addresses, an instruction register and a control decoder, all interconnected using the von Neumann architecture and employing a bidirectional parallel bus for data, address and instructions. U.S. Pat. No. 4,074,351, issued to Gary W. Boone, and Micheal J. Cochran, assigned to Texas Instruments, shows a single-chip "microcomputer" type device which contains a 4-bit parallel ALU and its control circuitry, with on-chip ROM for program storage and on-chip RAM for data storage, constructed in the Harvard architecture. The term microprocessor usually refers to a device employing external memory for program and data storage, while the term microcomputer refers to a device with on-chip ROM and RAM for program and data storage. In describing the instant invention, the term "microcomputer" will be used to include both types of devices, and the term "microprocessor" will be primarily used to refer to microcomputers without on-chip ROM; since the terms are often used interchangeably in the art, however, it should be understood that the use of one or the other of these terms in this description should not be considered as restrictive as to the features of this invention.

Modern microcomputers can be grouped into two general classes, namely general-purpose microprocessors and special-purpose microcomputers/microprocessors. General purpose microprocessors, such as the M68020 manufactured by Motorola, Inc., are designed to be programmable by the user to perform any of a wide range of tasks, and are therefore often used as the central processing unit in equipment such as personal computers. Such general-purpose microprocessors, while having good performance for a wide range of arithmetic and logical functions, are of course not specifically designed for or adapted to any particular one of such functions. In contrast, special-purpose microcomputers are designed to provide performance improvement for specific predetermined arithmetic and logical functions for which the user intends to use the microcomputer. By knowing the primary function of the microcomputer, the designer can structure the microcomputer in such a manner that the performance of the specific function by the special-purpose microcomputer greatly exceeds the performance of the same function by the general-purpose microprocessor regardless of the program created by the user.

One such function which can be performed by a special-purpose microcomputer at a greatly improved rate is digital signal processing, specifically the computations required for the implementation of digital filters and for performing Fast Fourier Transforms. Because such computations consist to a large degree of repetitive operations such as integer multiply, multiple-bit shift, and multiply-and-add, a special-purpose microcomputer can be constructed specifically adapted to these repetitive functions. Such a special-purpose microcomputer is described in U.S. Pat. No. 4,577,282, assigned to Texas Instruments Inc. The specific design of a microcomputer for these computations has resulted in sufficient performance improvement over general purpose microprocessors to allow the use of such special-purpose microcomputers in real-time applications, such as speech and image processing.

Digital signal processing applications, because of their computation intensive nature, also are rather intensive in memory access operations. Accordingly, the overall performance of the microcomputer in performing a digital signal processing function is not only determined by the number of specific computations performed per unit time, but also by the speed at which the microcomputer can retreive data from, and store data to, system memory. Prior special-purpose microcomputers, such as the one described in said U.S. Pat. No. 4,577,282, have utilized modified versions of a Harvard architecture, so that the access to data memory may be made independent from, and simultaneous with, the access of program memory. Such architecture has, of course, provided for additional performance improvement.

Direct memory access (DMA) is another useful function for special purpose microcomputers, especially those directed to digital signal processing. An on-chip DMA controller is often used in microcomputers having DMA capability, so that the DMA operation can occur independently from the central processing unit. However, regardless of the choice of Harvard or von Neumann architecture, the use of either program or data buses for the DMA operation may require that the DMA must wait for program or data access before continuing. In the case of a digital signal processor, the program and data buses are both heavily used. If DMA is given the lowest priority to the program and data buses, the DMA performance of the microcomputer can be quite slow.

However, in many applications, the computer program which the microcomputer wishes to execute is stored in memory which is external to the microcomputer. This especially impacts the performance of DMA operations, since DMA is primarily used for data communications between on-chip and external memory. Even if multiple buses are used internal to the microcomputer, the communication with external memory is still done with a single bus due to the need to minimize device terminals. Accordingly, the fetching of instruction codes from external memory can severely impact the performance of the DMA operation.

It is therefore an object of this invention to provide a microcomputer which has an instruction cache for storage of program memory, so that DMA operations to external memory may take place without being interrupted by instruction fetch operations from external memory.

It is a further object of this invention to provide such a microcomputer which has a DMA bus separate from the program bus which serves the instruction cache, to further minimize the interference between the instruction fetch and DMA operations.

It is a further object of this invention to provide such a microcomputer which has a single memory address space which can be flexibly partitioned by the user into data and program storage, so as to maximize the ability of the DMA operation to proceed without conflict with data and program access.

Further objects and advantages of the instant invention will become apparent to those of ordinary skill in the art having reference to the following specification, together with its drawings.

SUMMARY OF THE INVENTION

The invention may be incorporated into a microcomputer which has a peripheral port by which access to memory external to the microcomputer may be made, and which has a direct memory access (DMA) controller for communicating blocks of data from the peripheral port (and accordingly from external memory) to and from on-chip memory. An instruction cache is provided which allows the temporary storage of program memory in an on-chip fashion separate from other on-chip memory, so that often-used instruction codes which are otherwise stored in external memory can be quickly fetched by the microcomputer, without interference to or from any DMA operation which uses the peripheral port to external memory. In addition, a DMA bus is provided within the microcomputer which connects the peripheral port to the on-chip memory under the control of the DMA controller, so that either memory is accessed by way of the DMA bus, and data written to or read from the addressed location. The DMA bus is a separate bus from the address and data bus used within the microcomputer for program and data communication, so that the DMA controller is not required to share either the program or the data bus with the rest of the microcomputer.

DETAILED DESCRIPTION OF THE PREFERRED EMBODIMENT

Figure 1:
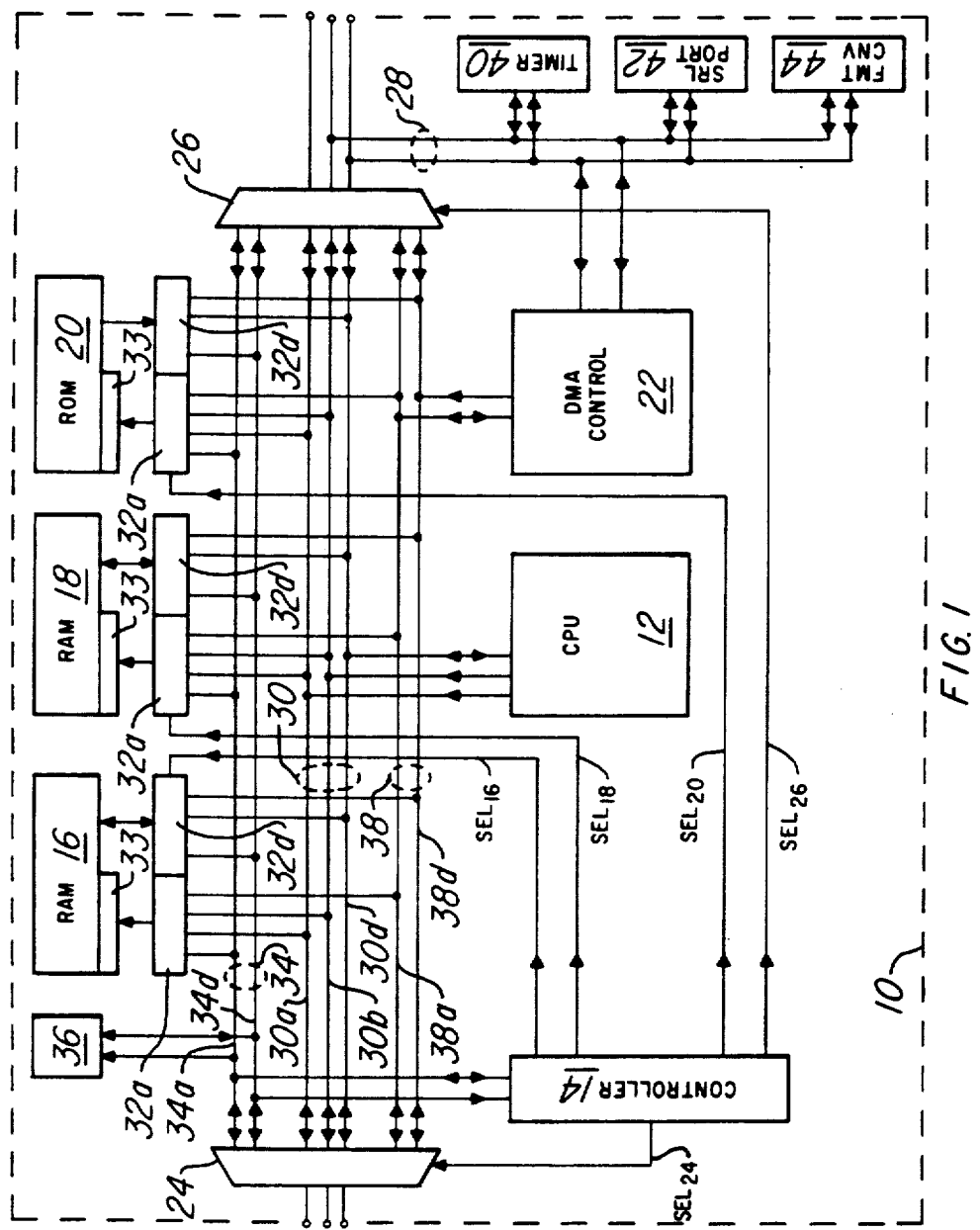
FIG. 1 is an electrical diagram, in block form, of a microcomputer constructed according to the invention.

Referring now to FIG. 1, the architecture of a microcomputer 10 is shown, said microcomputer being specially adapted to digital signal processing and incorporating the instant invention. The major functional blocks of microcomputer 10 are constituted by central processing unit (CPU) 12, controller 14, and direct memory access (DMA) controller 22. The memory contained in microcomputer 10 according to this embodiment of the invention includes random access memories (RAMs) 16 and 18, and read-only memory (ROM) 20. RAMs 16 and 18 contain, in this embodiment, $2^{10}$, or 1K, words; ROM 20 contains $2^{12}$, or 4K, words. External connection is made by way of interface ports 24 and 26, which multiplex various bus signals onto external terminals of microcomputer 10 and which provide special purpose signals for communication to external devices which are to receive and send data via such external terminals. Connected to interface port 26 is peripheral bus 28, which is adapted to be connected to various peripheral function blocks as will be explained hereinbelow.

Data communication within microcomputer 10 can be effected by way of data bus 30. Data bus 30 contains a set of data lines 30d which are dedicated to the communication of data signals among memories 16, 18 and 20, interface ports 24 and 26, and CPU 12. In this embodiment of the invention, data bus 30 contains thirty-two data lines in set 30d; accordingly, the data signals communicated among memories 16, 18 and 20, interface ports 24 and 26, and CPU 12 are considered as thirty-two bit words. Data bus 30 further contains a first set of address lines 30a and a second set of address lines 30b, both of which are for communication of address signals corresponding to memory locations in memories 16, 18 and 20. In this embodiment of the invention, data bus 30 contains twenty-four address lines in each of sets 30a and 30b. Address lines 30a and 30b are also connected among CPU 12, interface ports 24 and 26, and memories 16, 18 and 20. As is evident from FIG. 1, memories 16, 18 and 20 each have two ports 32a and 32d. Each of ports 32a are connected to address lines 30a and 30b of data bus 30, and receive the address signals presented thereupon to provide access to the corresponding memory location by way of port 32d to data lines 30d of data bus 30.

Microcomputer 10 also effects communication by way of program bus 34. Similarly as data bus 30, program bus 34 contains a set of data lines 34d connected to ports 32d of memories 16, 18 and 20. Data lines 34d of program bus are also connected to interface ports 24 and 26, and to controller 14. Program bus 34 further contains a set of address lines 34a, which are connected to ports 32a of memories 16, 18 and 20, to interface ports 24 and 26, and to controller 14. Also connected to address bus 34 is instruction cache 36 which also has ports 32a and 32d connected to address lines 34a and data lines 34d, respectively. Instruction cache 36 is a small (64 word) high speed memory which is used to retain the most recently used instruction codes so that, if external memory devices are used for program storage, the retrieval of repetitively used instructions can be effected at the same rate as from memories 16, 18 and 20. Detailed construction and operation of instruction cache 36 is given hereinbelow. Controller 14 contains such circuitry as required to decode instruction codes received on data lines 34d of program bus 34 into control signals which control the specific logic circuitry contained in all blocks of microcomputer 10. FIG. 1 illustrates lines $SEL_{16}$, $SEL_{18}$, $SEL_{20}$, $SEL_{24}$ and $SEL_{26}$ which carry certain of these control signals to control access of microcomputer 10 to memories 16, 18, and 20, and peripheral ports 24 and 26, respectively; other such control signals generated by controller 14 are not shown in FIG. 1, for purposes of clarity. Because of its connection to instruction cache 36 and to controller 14, program bus 34 is used primarily for the addressing and communication of instruction codes contained in memories 16, 18 and 20. According to the invention, such instruction codes can reside in any of memories 16, 18 and 20, or in external memory, without designation of any specific locations as dedicated to program memory.

DMA controller 22 is connected to memories 16, 18 and 20 by way of DMA bus 38. Similarly as data bus 30 and program bus 34, DMA bus 38 has a set of data lines 38d which are connected to ports 32d of memories 16, 18 and 20. DMA bus 38 further has a set of address lines 38a connected to ports 32a of memories 16, 18 and 20. DMA controller 22 is also connected to peripheral bus 28, and to interface port 26 via peripheral bus 28. DMA controller 22 effects direct memory access operations, by which blocks of data stored within the memory space of microcomputer 10 may be moved from one area of memory (the source) to another (destination). The source area of memory may be within memories 16, 18 or 20, or in memory devices external to microcomputer 10 which are connected to the terminals served by interface port 24, and the destination of the block of data may be in all of such memories (except of course ROM 20). It is apparent from the construction of microcomputer 10 as shown in FIG. 1, and from the description given hereinbelow, that such DMA operations may be effected by DMA controller 22 in microcomputer 10 without requiring the intervention of CPU 12.

Ports 32a are primarily multiplexers, so that selection of one set of address lines 30a, 30b, 34a, or 38a for connection to its associated memory 16, 18 or 20 can be effected. Similarly, each of ports 32d are connected to data lines 30d of data bus 30, for communication of the data stored (or to be stored) by the addressed memory location. Memories 16, 18 and 20 each contain an address decoder 33, connected to its port 32a, for decoding the memory address signal presented on the selected one of said address lines 30a, 30b, 34a, or 38a in a manner well known in the art. Based on the output from address decoder 33, access is granted to the memory location specified by the selected address signal. RAMs 16 and 18, and ROM 20, are all constructed as are well known in the art, so that the selected memory location is sensed and/or written based upon the output of address decoder 33 therewithin. As is also well known in the art for such memories, ports 32d provide a high-impedance output to the data lines of buses 30, 34 and 38 connected thereto when not selected, thereby preventing data conflicts on buses 30, 34 and 38.

Each of the sets of address lines in data bus 30, program bus 34 and DMA bus 38 consist of twenty-four conductors in the preferred embodiment of this invention. Accordingly, the maximum number of memory locations addressable by way of the sets of address lines in data bus 30, program bus 34 and DMA bus 38 is $2^{24}$ words (sixteen Mwords) of thirty-two bits. However, since the total number of words in memories 16, 18 and 20 is 6K, a large amount of the addressable memory space of microcomputer 10 may reside in memory devices external to microcomputer 10. Such external memory will of course also have address decoding capability, similar to the on-chip memories 16, 18 and 20, and will respond to the generated address signals on the address lines of buses 30, 34 and 38 in a similar fashion. According to the instant invention, a single memory address space is provided for microcomputer 10, so that a given address signal presented on any given set of address lines of buses 30, 34 and 38 will address a memory location in only one of memories 16, 18 and 20. Therefore, using the example of address lines 30a being selected by ports 32a, a given address signal on address lines 30a will correspond to a memory location in only one of memories 16, 18 and 20, or in external data, program or input/output memory. It should be noted that microcomputer is organized in such a fashion that it is preferable that external data and program memory be accessed by way of peripheral port 24, and that external input/output memory be accessed by way of peripheral port 26.

Peripheral bus 28 is connected between interface port 26 and various peripheral functions. Peripheral bus is therefore selectively connectable to any one of buses 30, 34 and 38, depending upon the control of peripheral port 26 by controller 14. In this manner, peripheral bus 28 appears to the remainder of microcomputer 10 as an off-chip bus. This provides for such functions as normally provided by peripheral devices to be incorporated into microcomputer 10; communications with such peripheral devices will be enacted by the remainder of microcomputer 10 in much the same way as an off-chip device. By way of example, microcomputer 10 of FIG. 1 has timer 40, serial port 42, and format converter 44 attached to peripheral bus 28; as discussed above, DMA controller 22 is also connected to peripheral bus 28. Similarly as the other buses described above, peripheral bus 28 contains data lines 28d and address lines 28a. In contrast to the communication between memories 16, 18 and 20 and the remainder of microcomputer 10 connected to buses 30, 34 and 38, however, address lines 28a of peripheral bus 28 are used to select one of said peripherals 40, 42, or 44 connected thereto to receive or transmit data from or to data lines 28d of peripheral bus 28. In addition, as will be described below, control registers in DMA controller 22 are also accessed by way of peripheral bus 28.

Figure 2:
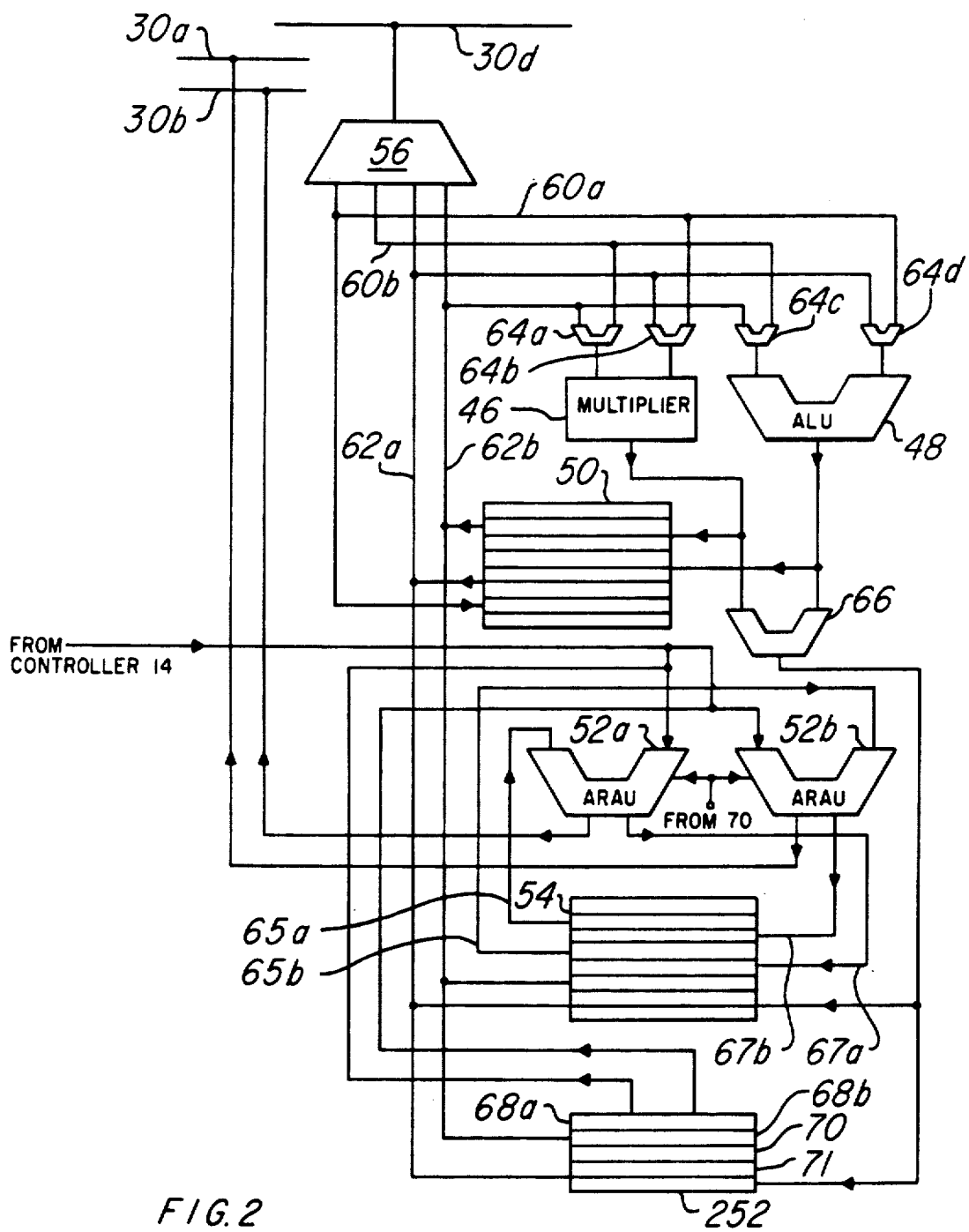
FIG. 2 is an electrical diagram, in block form, of the central processing unit of the microcomputer of FIG. 1.

Referring now to FIG. 2, the construction and operation of CPU 12 will be explained in detail. CPU 12 contains a dedicated multiplier 46, an arithmetic logic unit (ALU) 48, data registers 50a through 50h (collectively referred to as data registers 50), auxiliary arithmetic logic units (ARAUs) 52a and 52b, auxiliary data registers 54a through 54h (collectively referred to as data registers 54), data bus controller 56, and a bank of control registers (including, but not limited to, index registers 68a and 68b, block register 70 and status register 71) which will be further described below.

One of the inputs to multiplier 46 is operable to receive data from either CPU bus 60a or register bus 62a via multiplexer 64a, and the other of the inputs to multiplier 46 is operable to receive data from either CPU bus 60b or register bus 62b, via multiplexer 64b. Similarly, ALU 48 performs operations on its two inputs, one of which is operable to receive data from either CPU bus 60a or register bus 62a via multiplexer 64c, and the other of the inputs to multiplier 46 is operable to receive data from either CPU bus 60b or register bus 62b, via multiplexer 64d. Multiplexers 64a through 64d are controlled by controller 14, according to the instruction code to be executed by CPU 12.

Multiplier 46 is a floating-point multiplier as is well known in the art, in effect containing both a hardware multiplier (for multiplication of the mantissas) and an arithmetic logic unit (for addition of the exponents). Multiplier 46 in the preferred embodiment of the invention is of the size which can perform an integer multiplication to produce a thirty-two bit result, and which alternatively can perform a floating-point multiplication to produce a forty-bit result, considering thirty-two of the bits as the mantissa of the floating-point operands, and the other eight bits as the exponent of the floating-point operands. ALU 48 is an arithmetic logic unit constructed according to any one of a number of well known configurations which can perform integer and floating-point addition and subtraction on up to two forty bit binary numbers. As will be described in further detail hereinbelow, the parallel combination of multiplier 46 and ALU 48 allows CPU 12 to perform operations using both functions simultaneously, which provides for rapid calculation of such operations as multiply-and-accumulate instructions. The outputs of multiplier 46 and ALU 48 are each connected to data registers 50, so that the results of the operations executed by each of multiplier 46 and ALU 48 can be stored in selected ones of said data registers 50.

Data registers 50 are forty-bit registers, used to store data in integer or floating-point format, depending upon the user's application. When storing information in floating-point format, the eight most significant bits are considered as the exponent, and the thirty-two least significant bits are considered as the mantissa. The primary function of data registers 50 is an accumulator function, so that the plurality of data registers 50 in effect provides CPU 12 with multiple accumulators. Data registers 50 are also connected to register buses 62a and 62b, which can provide output to data bus 30 via data bus controller 56, and be provided as inputs again to multiplier 46 and ALU 48. Accordingly, a multiply and accumulate instruction can be easily and efficiently implemented by CPU 12. For example, the result of a multiplication by multiplier 46 can be input to ALU 48 via one of data registers 50 and register bus 62a, for addition to a prior result stored in another one of data registers 50 and applied to ALU 48 via register bus 62b. The outputs of multiplier 46 and ALU 48 are also connected to the inputs of multiplexer 66, which is also controlled by controller 14. The output of multiplexer 66 is connected to auxiliary registers 54, so that the results of the operation of either multiplier 46 or ALU 48 can be stored in a selected one of auxiliary registers 54, or in the bank of control registers including index registers 68a and 68b, block register 70 and status register 71.

Auxiliary registers 54 are thirty-two bit registers used in conjunction with ARAUs 52 to generate addresses for application to address lines 30a and 30b of data bus 30, and for computation of subsequently used addresses stored in auxiliary registers 54. Auxiliary registers 54 are connected to one input of each of ARAUs 52a and 52b by way of auxiliary register buses 65a and 65b, respectively. Each of ARAUs 52a and 52b also have an input connected to controller 14, an input connected to index registers 68a and 68b, and an input connected to block register 70, all for receiving address modification signals depending upon the address mode specified by the instruction code being executed. ARAUs 52a and 52b have an output connected to address lines 30a and 30b of data bus 30, respectively, upon which ARAUs 52a and 52b present a memory address signal. In addition, ARAUs 52a and 52b have an output connected to buses 67a and 67b, respectively, for storing in selected ones of auxiliary registers 54 the results of modifications generated in the process of memory addressing, as will be explained below. As is evident by reference to FIG. 1, and as well known in the art, instruction codes executable by microcomputer 10 addresses memories 16, 18 and 20, as well as external memory via peripheral ports 24 and 26, in a plurality of ways; examples of such addressing include addressing of an individual register 50 and 54 in CPU 12 and direct addressing of a location in memories 16, 18 and 20, and the well-known immediate and relative addressing modes.

Indirect memory addressing is facilitated by ARAUs 52a and 52, in conjunction with auxiliary registers 54. As is well known, indirect addressing in microcomputers is a mode of memory addressing where the address of the memory location is contained in the specified location. An example of indirect memory addressing is an instruction to the microcomputer to "address the memory location specified by the contents of register 50a." Indirect addressing allows registers 54 to be used as dynamic memory address pointers, which allow the computation of a memory location by CPU 12 (and its storage in one of registers 54) without the necessity of changing the contents of a program memory location. In addition, ARAUs 52a and 52b are operable to utilize a displacement code generated from the instruction code, which modifies the computation of the indirect address by ARAUs 52a and 52b. The displacement code is an eight-bit code generated by controller 14 in its decoding of the instruction code, and is input to one of the inputs of each of ARAUs 52a and 52b. CPU 12 interprets the absence of a displacement signal as an implied value of one, which is useful to automatically increment or decrement the contents of the register 54 used in a repetitive operation. As such, ARAUs 52a and 52b are primarily used in the addressing of data locations in RAMs 16 and 18, and in external RAM used as data memory; as shown in FIG. 1, addresses generated by ARAUs 52a and 52b on address lines 30a and 30b can of course also access ROM 20. ARAUs 52a and 52b are thus operable to perform the necessary integer addition or subtraction operation upon the contents of the one of registers 54 connected to one of its inputs and upon the displacement code generated by controller 14. Table 1 lists a number of the types of indirect addressing modes supported in part by ARAUs 52a and 52b in conjunction with registers 54 and controller 14. It should be noted that the instruction codes stored in the program memory portions/locations of memories 16, 18 and 20 (or externally) contain a five-bit code which specifies the memory addressing mode desired, including those listed in Table 1. In Table 1, "add" specifies the memory location to be addressed, "ARn" specifies the contents of one of registers 54, and "disp" the value of the displacement code generated by controller 14. The updated value of the contents of one of auxiliary registers 54 is denoted by "ARn'" in Table 1.

TABLE 1

| Description | Operation |
|---|---|
| Indirect w/pre-displacement add | add = ARn + disp |
| Indirect w/pre-displacement subtract | add = ARn − disp |
| Indirect w/pre-displacement add/modify | add = ARn + disp<br>ARn' = ARn + disp |
| Indirect w/pre-displacement subtract/modify | add = ARn − disp<br>ARn' = ARn − disp |
| Indirect w/post-displacement add/modify | add = ARn<br>ARn' = ARn + disp |
| Indirect w/post-displacement subtract/modify | add = ARn<br>ARn' = ARn − disp |

CPU 12 contains index registers 68a and 68b, also connected to the output of multiplexer 66, connected to register buses 62a and 62b, and and are also directly connected to the inputs of ARAUs 52a and 52b which receive the displacement codes from controller 14. Controller 14 of course will control the application of index register 68a, index register 68b, or the displacement code to this other input of ARAUs 52a and 52b. Index registers 68a and 68b can be loaded by ALU 48 for storing an index value to be utilized in the indexed indirect addressing of memories 16, 18 and 20 (as well as external memory), by way of ARAUs 52a and 52b. Table 2 contains the indexed indirect addressing modes which, responsive to corresponding instruction codes received and decoded by controller 14, are executable by ARAUs 52a and 52b. Similarly as the addressing modes listed in Table 1, these individual addressing modes are enabled by unique ones of five-bit codes in the instruction code. The term "IRm" in Table 2 indicates the contents of one of index registers 68a and 68b.

TABLE 2

| Description | Operation |
|---|---|
| Indirect w/pre-index add | add = ARn + IRm |
| Indirect w/pre-index subtract | add = ARn − IRm |
| Indirect w/pre-index add/modify | add = ARn + IRm<br>ARn' = ARn + IRm |
| Indirect w/pre-index subtract/modify | add = ARn − IRm<br>ARn' = ARn − IRm |
| Indirect w/post-index add/modify | add = ARn<br>ARn' = ARn + IRm |
| Indirect w/post-index subtract/modify | add = ARn<br>ARn' = ARn − IRm |

Figure 2A:
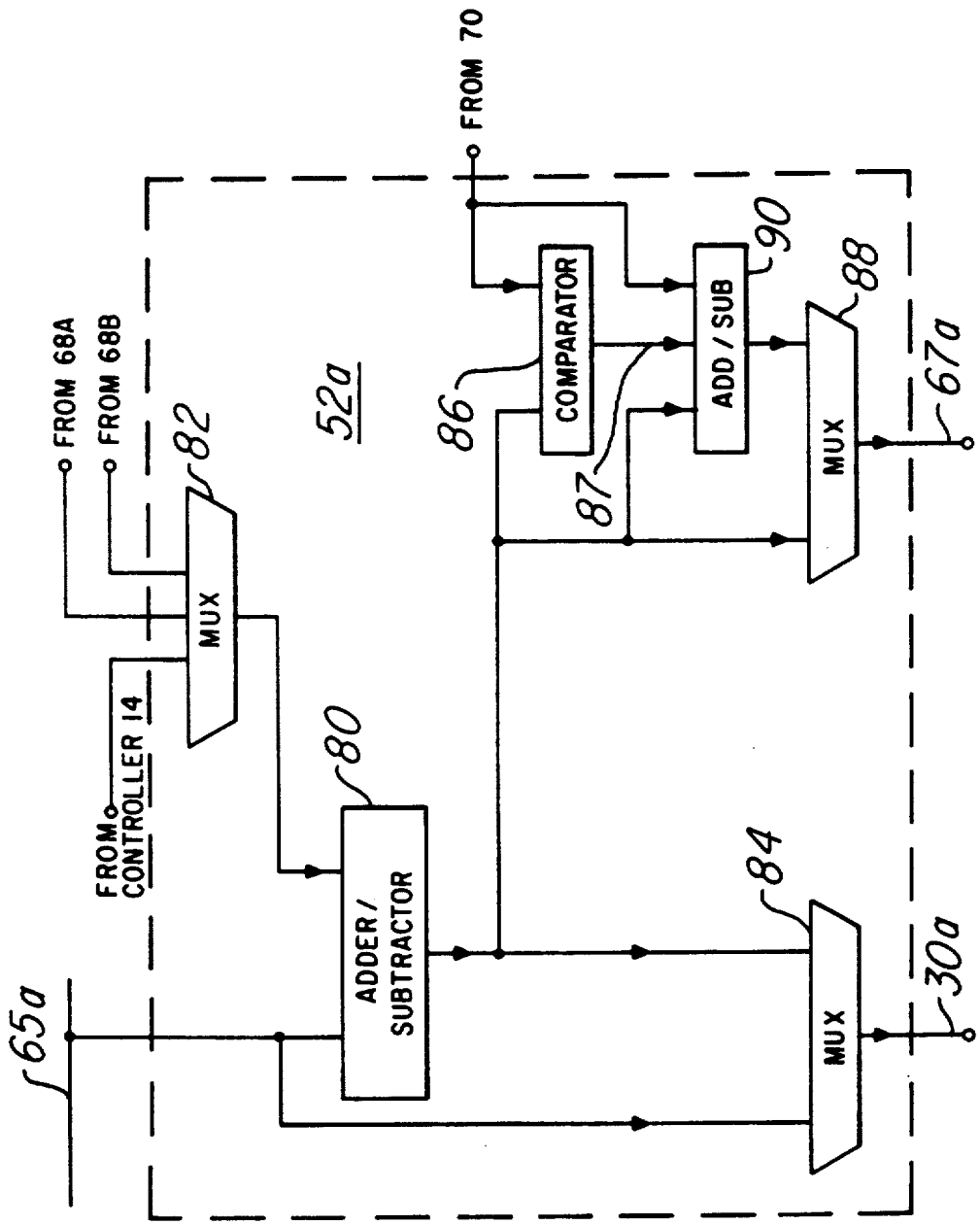
FIG. 2a is an electrical diagram, in block form, of an auxiliary arithmetic logic unit incorporated in the central processing unit of FIG. 2.

Referring now to FIG. 2a, the construction of ARAU 52a is illustrated in detail; it is of course understood that ARAU 52b is similarly constructed. As shown in FIG. 2, ARAU 52a receives at at one input auxiliary register bus 65a, which is connected to one input of adder/subtractor 80. Multiplexer 82 receives three input signals; one of these input signals is the displacement code generated by controller 14, and the other two input signals are the contents of index registers 68a and 68b. Multiplexer 82 is controlled by controller 14, responsive to the instruction code being executed, to select one of these three inputs for application to the second input of adder/subtractor 80.

Adder/subtractor 80 is a multiple-stage arithmetic logic unit as is well known in the art, which is capable of performing either a full-carry add or subtract. Controller 14 controls whether or not adder/subtractor 80 performs the add or subtract operation, responsive to decoding of the instruction code containing the address mode information. Adder/subtractor 80 further contains capability for propagating the carry information from stage to stage therewithin either in a forward or in a reverse direction. Such an adder/subtractor is described in copending U.S. patent application 935,465; said application further describes the benefits of reverse-carry propagation in performing Fast Fourier Transform algorithms. Controller 14 similarly controls the direction of carry propagation in adder/subtractor 80, responsive to the instruction code being executed.

The output of adder/subtractor 80 is connected to one input of multiplexer 84, and is also connected to one input of comparator 86. The other input of multiplexer 84 is connected directly to auxiliary register bus 65a, and the output of multiplexer 84 is connected to address lines 30a of data bus 30. Multiplexer 84 is controlled by controller 14 responsive to the current instruction code, for application of the proper value of the computed address to address lines 30a of data bus 30. The output of adder-subtractor 80 is also connected to a first input of multiplexer 88, which has its output connected to bus 67a which communicates data from ARAU 52a to a selected one of auxiliary registers 54, for updating of the auxiliary register 54 contents as desired. A second input of multiplexer 88 is connected to adder/subtractor 90. Comparator 86 and adder/subtractor 90 comprise circular addressing logic which will be explained hereinbelow; for purposes of the following discussion, its operation will be ignored.

By reference to FIG. 2a, the operation of ARAU 52a in accomplishing the various indirect addressing modes listed in Tables 1 and 2 becomes apparent. Controller 14, responsive to the instruction code being executed, controls multiplexer 82 to select the desired one of index registers 68a or 68b ("IRm" in Table 2) or the displacement code generated by controller 14, for application to the contents of the selected one of auxiliary registers 54 by adder/subtractor 80. As described above, controller 14 will also control whether or not adder/subtractor 80 performs an addition or subtraction operation, and also whether adder/subtractor 80 will calculate its output using the forward or reverse carry propagation. In the event that the desired address mode is a post-index or post-displacement add or subtract, controller 14 will cause multiplexer 84 to select auxiliary register bus 65a to be connected to address lines 30a of data bus 30 (corresponding to the operation "add = ARn" in Tables 1 and 2). Conversely, if the desired indirect address mode is a pre-index or pre-displacement indirect address, controller 14 will cause multiplexer 84 to select the output of adder/subtractor 80 for application to address lines 30a of data bus 30 (corresponding to the operation "add = ARn + / − IRm/disp" in Tables 1 and 2).

ARAU 52a also determines the updating of auxiliary registers 54 according to the indirect addressing modes selected. Assuming that the circular indirect addressing mode is not selected (such circular addressing will be discussed hereinbelow), controller 14 will select whether or not the contents of the selected one of auxiliary registers 54 are to be modified or not. In the event the desired indirect addressing mode does not modify the contents of the auxiliary register 54, controller 14 will disable (tri-state) the output of multiplexer 88, so that the contents of the selected one of auxiliary registers 54 will not be updated. If the contents of the selected one of auxiliary registers 54 are to be modified with the result of the addition or subtraction by adder/subtractor 80, controller 14 will cause multiplexer 88 to select the output of adder/subtractor 80 for application to bus 67a (corresponding to the operation "ARn'=ARn+/−IRm/disp" in Tables 1 and 2).

It is of course apparent from the construction of CPU 12 shown in FIG. 2 that the operation of the various functions can occur in parallel. For example, ARAU 52a can be operating in parallel with ARAU 52b, since the inputs thereto are separately connected to registers 54, and to controller 14 (and index registers 68a and 68b). In addition, the output of ARAU 52a is connected to address lines 30a of data bus 30 and to bus 67a, while the output of ARAU 52b is connected to address lines 30b of data bus 30 and to bus 67b. In this manner, the operation of ARAUs 52a and 52b can occur simultaneously, without interference by or to one another. In addition, once the prior state of register buses 62a and 62b have been received by multiplier 46 and ALU 48 as desired, the operation of multiplier 46 and ALU 48 can occur simultaneously not only with each other, but also with ARAUs 52a and 52b. In this way, especially for algorithms using repetitive operations such as multiply-and-accumulate, CPU 12 is able to achieve substantial performance improvements from such parallel operation.

Block register 70 is connected to the output of multiplexer 66, and is connected to register buses 62a and 62b, as well as being directly connected to ARAUs 52a and 52b. Block register 70 provides a "circular" feature in the indirect addressing scheme, so that a block of data memory locations can be repetitively accessed in a looped fashion. As is well known in the art, certain computations required for digital signal processing applications can be expressed in repetitive operations on a block of stored data. For example, the computation of finite impulse response (FIR) digital filter functions, requires the repetition of multiply-and-accumulate operations on a block of data, where the results of the multiply-and-accumulate are stored in the memory location from which one of the operands was fetched.

Figure 2B:
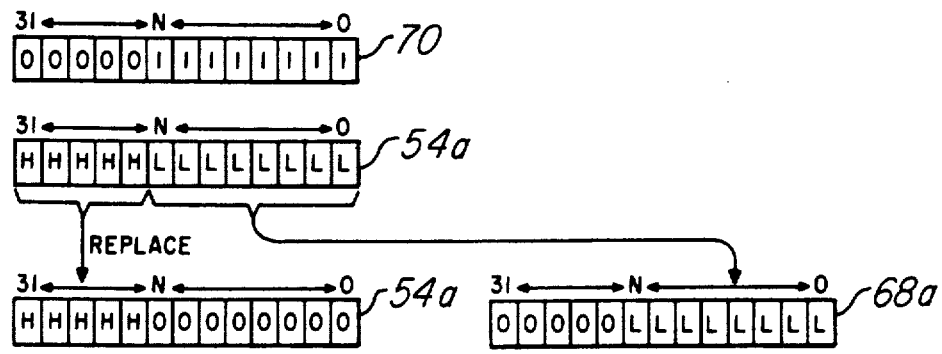
FIGS. 2b and 2c are flow diagrams of certain computations useful in the circular addressing mode performable by the microcomputer of FIG. 1.

Referring now to FIG. 2b, the operation of circular addressing is explained by reference to the contents of various registers in CPU 12. CPU 12 effects circular addressing by first interrogating block register 70 by ALU 48 to determine the location of the most significant stored "1" data state, referred to herein as bit location "N". The value stored in block register 70 contains the number of memory locations in the data block to be addressed circularly. The original base address of the data block (at one end of the data block) is considered to be the contents of the one of auxiliary registers 54 utilized in the indirect addressing mode, with those bit locations equal to and less significant than the bit location with the most significant "1" state in block register 70 at a "0" logic state. FIG. 2b illustrates this by showing the N least significant bits of the contents of auxiliary register 54a equal to "0", N being the bit location of the most-significant "1" in block register 70. It should be noted that the displacement code from controller 14 may also be used with the circular addressing feature, replacing the contents of index register 68a; for purposes of this example, the contents of index register 68a will be used in describing the operation of the circular addressing feature. As a result, the end of the block of stored data can be thought of as the original base address (stored in auxiliary register 54a) with bit locations N and lower containing the contents of block register 70. This value is the memory address of the end of the block of data, plus one.

Figure 2C:
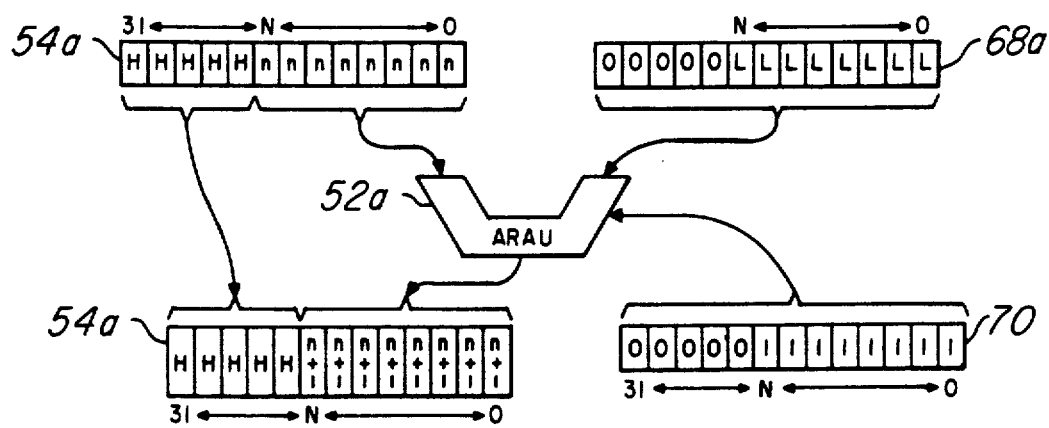

Referring to FIG. 2c, an example of the operation of incrementing auxiliary register 54a using circular addressing is explained. The contents of the bit locations of auxiliary register 54a corresponding to the bit locations greater than N (i.e., above the most significant "1" in block register 70) remains at all times equal to the contents of bit locations greater than N of the base address originally stored therein. The contents of bits N and lower of auxiliary register 54a (hereinafter referred to as the "index") are to be combined with the contents of index register 68a computed as described above (hereinafter referred to as the "step"). As discussed above, these bits N and lower of auxiliary register 54a are originally zeroes, but the explanation of the circular addressing mode will be explained in the general case hereinbelow. ARAU 52a or 52b, as the case may be, performs the combination of the index with index register 68a as specified by the addressing mode (i.e., index and step added, or step subtracted from index). For purposes of this example, ARAU 52a will be referred to as the one of ARAUs 52a and 52b used in the circular addressing mode.

Circular addressing is accomplished by comparator 86 and adder/subtractor 90 of ARAUs 52a and 52b, illustrated in FIG. 2a. Comparator 86 provides to adder/subtractor 90 a control output (shown by line 87 of FIG. 2a) corresponding to the result of the comparison of the contents of block register 70 and the bits of the output of adder/subtractor 80 selected as described above (the "index") in conjunction with certain relationships among the values of the index and step, to the contents of block register 70. A first such relationship provides that, if the combination of the index and the step is greater than or equal to zero and less than or equal to the contents of block register 70, then bits N and lower of the updated contents of auxiliary register 54a will consist of the sum (or difference, as the case may be) of the index and the step. In other words, if the conditions of the first relationship are met, adder/subtractor 86 will perform neither an addition nor a subtraction, but will merely apply at its output the output of adder/subtractor 80. The equation for this first relationship can be expressed as follows:

$$IF 0 <= index_n +/- step <= block$$

$$THEN\ index_{n+1} = index_n +/- step$$

In the above relationship, "$index_n$" is the contents of bit locations N and lower of auxiliary register 54a prior to modification, "$index_{n+1}$" refers to the contents of bit locations N and lower after modification, "step" refers to the contents of index register 68a (in this example) and "block" refers to the contents of block register 70.

A second relationship provides that, if the combination of the index and the step is less than zero, the modified contents of bits N and lower of auxiliary register 54 will be the sum (or difference) of the index and step, plus the contents of block register 70. This is accomplished in ARAU 52a by the control output of comparator 86 causing adder/subtractor 90 to add the contents of block register 70 to the output of adder/subtractor 80. The results of this addition are then applied to multiplexer 88. In equation form:

IF0 > index$_n$ +/− step

THEN index$_{n+1}$ = (index$_n$ +/− step) + block

Finally, in the event that the combination of bit locations N and lower of auxiliary register 54a is greater than the contents of block register 70, the contents of block register 70 will be subtracted from the addition (subtraction) of the index and the contents of index register 68a. As in the above relationship, ARAU 52a accomplishes this by comparator 86 causing adder/subtractor 90 to subtract the contents of block register 70 from the output of adder/subtractor 80, and apply the results to multiplexer 88. The equation is as follows:

IF index$_n$ +/− step > block

THEN index$_{n+1}$ = (index$_n$ +/− step) − block

Controller 14 selects the circular addressing mode by causing multiplexer 88 to select the output of adder/subtractor 90 for application to bus 67a, illustrated in FIG. 2a.

As is evident from the above description, the circular addressing feature not only provides automatic looping of addresses for memory locations, but also is operable in the event that the modification of the memory address ventures outside the desired data block. This provides for additional flexibility in the addressing of a block of data. For example, if the block size is odd, with an index of two the memory block would be addressed by sequencing first through the even memory addresses, followed by sequencing through the odd memory addresses. Certain digital signal processing applications are performable with less program and data space required, and with faster performance, by way of such a method.

The effect of the circular addressing feature in the indirect addressing function is to create additional addressing modes. Table 3 lists those indirect addressing modes with the circular addressing feature which are incorporated in the preferred embodiment of the instant invention. The term "circ()" indicates the combination of the circular feature described above in the operation on the contents of the selected one of auxiliary register 54 represented by "ARn" with the displacement code or index register 68, as the case may be, and the modified contents of auxiliary register 54 represented by "ARn'".

TABLE 3

| Description | Operation |
| --- | --- |
| Indirect w/post-displacement add and circular modify | add = ARn<br>ARn' = circ(ARn + disp) |
| Indirect w/post-displacement subtract and circular modify | add = ARn<br>ARn' = circ(ARn − disp) |
| Indirect w/post-index add and circular modify | add = ARn<br>ARn' = circ(ARn + IRm) |
| Indirect w/post-index subtract and circular modify | add = ARn<br>ARn' = circ(ARn − IRm) |

Referring back to FIG. 2, data bus controller 56 is connected to data lines 30d of data bus 30, and serves to control the flow of data from data bus 30 to the various portions of CPU 12. Internal to CPU 12 are a pair of CPU buses 60a and 60b, and a pair of register buses 62a and 62b. Data bus controller 56 consists of a four-to-one multiplexer, having its four inputs connected to CPU buses 60a and 60b, and to register buses 62a and 62b. Communication from CPU 12 to data lines 30d of data bus 30 thus can occur from any one of these four internal buses at any given time; such communication of course requires that a corresponding address signal be generated on address lines 30a or address lines 30b in conjunction with the data communication on data lines 30d. Since the outputs of ARAUs 52a are connected to address lines 30a and 30b of data bus 30, respectively, such addresses can be generated by CPU 12 in conjunction with the desired data communication through data bus controller 56.

The parallel nature of ARAUs 52a and 52b allows the computation of more than one memory address by CPU 12 within a single machine cycle. Accordingly, data bus controller 56 is capable of connecting more than one of CPU buses 60 and register buses 62 to data lines 30d of data bus 30 within a single machine cycle. Control of the application of the output of ARAUs 52a and 52b to the address lines 30a and 30b of data bus 30, and of the time-multiplexing of data lines 30d to the internal buses of CPU 12, is done by controller 14 according to the instruction code being executed.

Figure 3:
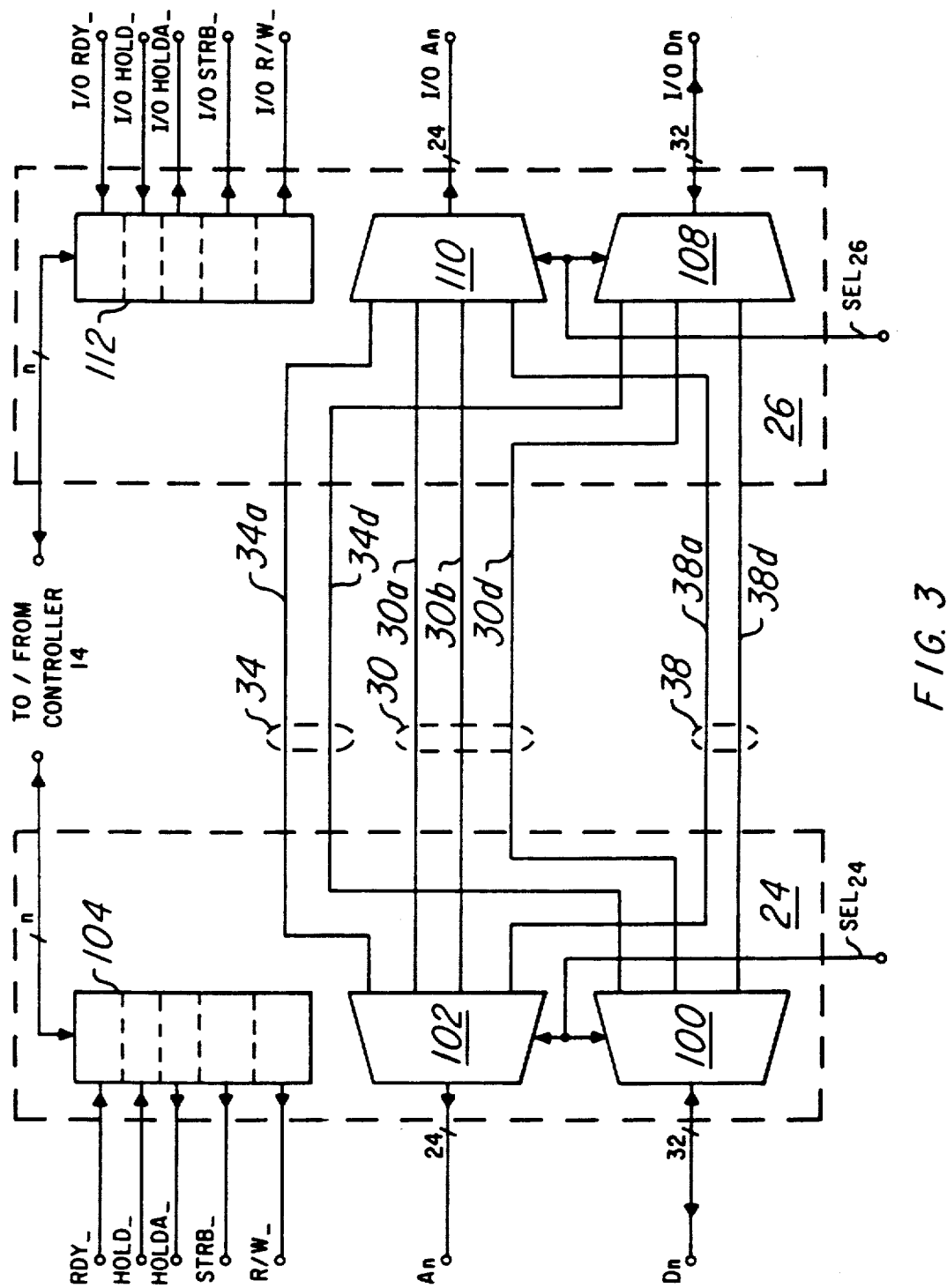
FIG. 3 is an electrical diagram, in block form, of the peripheral ports of the microcomputer of FIG. 1.

Referring now to FIG. 3, the construction of peripheral ports 24 and 26 will be described in detail. Peripheral ports 24 and 26 are connected to data bus 30, program bus 34 and DMA bus 38, as was described earlier with reference to FIG. 1. Peripheral port 24 consists primarily of a multiplexer 100, which selectively connects external data lines D$_n$ to data lines 30d of data bus 30, data lines 34d of program bus 34 or data lines 38d of DMA bus 38, responsive to control signals generated on lines SEL$_{24}$ by controller 14. It should be noted that multiplexer 100 creates a bidirectional connection between external data lines D$_n$ and the data lines 30d, 34d or 38d, so that data may be received or presented therebetween. In addition, multiplexer 102 selectively connects external address lines A$_n$ to address lines lines 30a or 30b of data bus 30, address lines 34a of program bus 34, or address lines 38a of DMA bus 38, also responsive to controller 14 depending upon which data lines are connected by multiplexer 100 to data lines D$_n$.

A number of control lines are driven by buffers 104 in peripheral port 24, also responsive to signals generated by controller 14 (on lines which are not shown, for purposes of clarity). These control lines output by peripheral port 24 include line R/W_, which specifies the direction of the flow of data through peripheral port 24. For example, an external memory device could serve as data memory, by having its data input and output terminals connected to lines D$_n$ and its address terminals connected to lines A$_n$. Peripheral port 24 of microcomputer 10 could effect a memory read of such external memory by connecting the desired address lines, e.g., address lines 30b of data bus 30, to lines A$_n$ and by driving line R/W_ to a high logic state, indicating that the external memory device is to be read at the location specified on address lines 30b of data bus 30. Conversely, a low logic state on line R/W_ would indicate that the external memory device is to be written with the data state present on data lines 30d, connected via multiplexer 100 to lines D$_n$.

The control lines connected to peripheral port 24 further include line STRB_ (as in line R/W_, the "_" designation indicating active low) driven by buffers 104 responsive to controller 14, which is a clock signal indicating to external memory that the set of address lines 30a, 30b, 34a or 38a connected to lines A_n, as the case may be, are presenting a valid address signal to address memory. Lines HOLD_ and RDY_ are inputs to microcomputer 10 from external devices. Line HOLD_ being active low causes peripheral port 24 to place its interface to lines D_n, A_n, R/W_, and STRB_ in a high-impedance state, so that a plurality of devices connected to such lines may communicate among one another without interference from, or interference to, microcomputer 10. Line HOLDA_ is an acknowledge signal driven by controller 14 via buffers 104 in peripheral port 24, and is has a low logic state which indicates that microcomputer 10 has received the HOLD_ signal in its low state, and has placed peripheral port 24 in a high impedance state. Line RDY_ is an input to microcomputer 10 and, when driven to its low logic state, indicates that an external device connected to data lines D_n, address lines A_n, and control lines R/W_ and STRB_ has completed a communication cycle with microcomputer 10. Controller 14 requires the RDY_ signal prior to causing peripheral port 24 to drive said lines to valid states other than that directed to the communication cycle which had ended with the RDY_ signal low.

Peripheral port 26 is similarly constructed as peripheral port 24, but is controlled by lines SEL_26 independently from peripheral port 24, so that communication at both peripheral ports 24 and 26 can occur simultaneously and independently, so long as the buses 30, 34 and 38 used by the two ports are not simultaneously used. Peripheral port 26 is primarily useful in communication with external input and output devices. Accordingly, as shown in FIG. 3, peripheral port 26 contains multiplexers 108 and 110, and buffers 112, corresponding to like components in peripheral port 24. Similarly, peripheral port 26 interfaces data bus 30, program bus 34 and DMA bus 38 to lines I/OD_n, I/OA_n, I/ORDY_, I/OSTRB_, I/OHOLD_, I/OHOLDA_ and I/OR/W_, having the same functions as similarly designated lines at peripheral port 24. It should be noted that, because of the plurality of buses 30, 34, and 38 connected to peripheral ports 24 and 26, peripheral port 24 and peripheral port 26 can be operating simultaneously.

Figure 4:
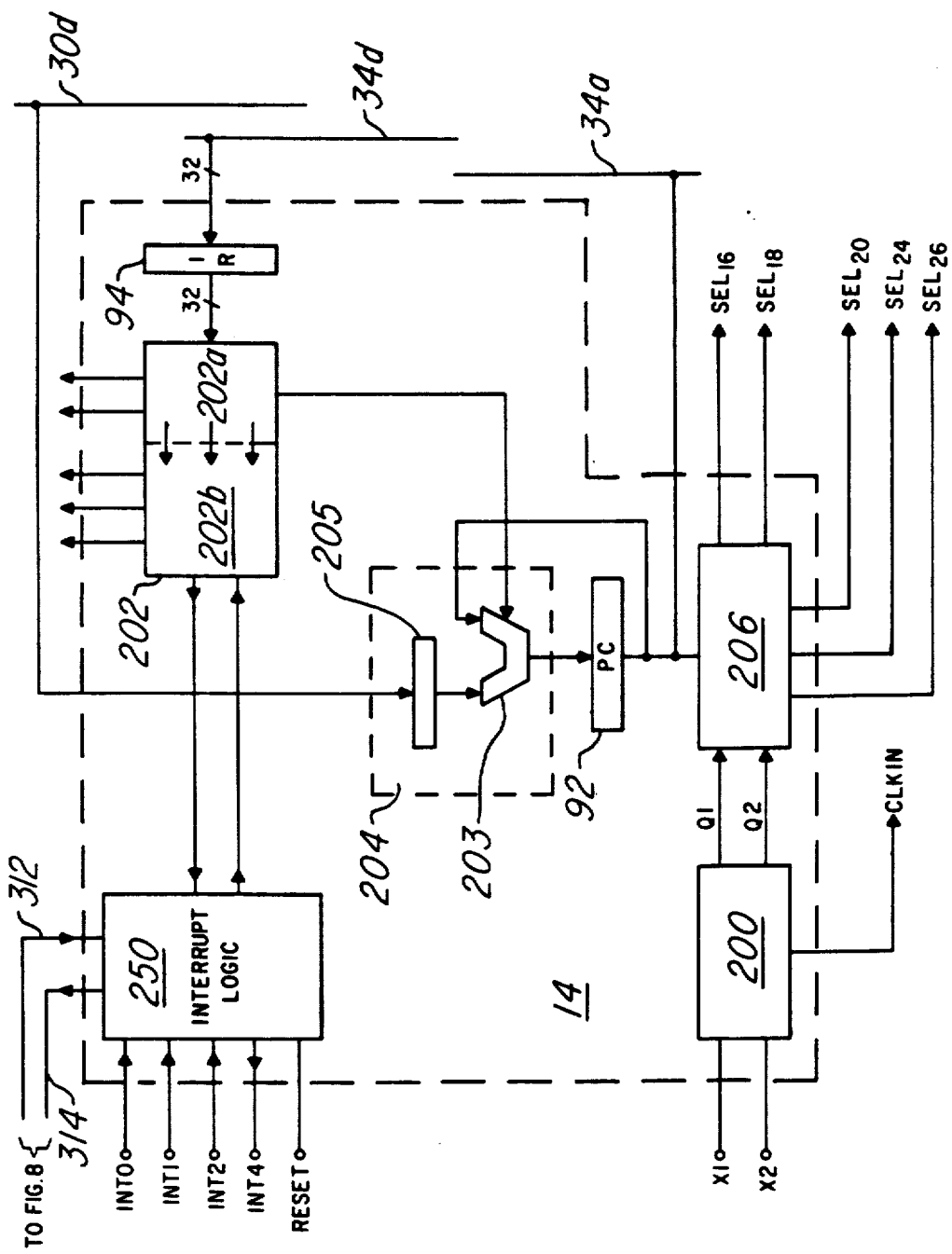
FIG. 4 is an electrical diagram, in block form, of the controller of the microcomputer of FIG. 1.

Referring now to FIG. 4, the construction and operation of controller 14 will be described in detail. Controller 14 serves the purposes of controlling the operation of the rest of microcomputer 10, so that the desired operation specified by the instruction codes will be properly executed.

Controller 14 receives clock signals presented from external to microcomputer 10. Clock generator 200 in controller 14 is connected to terminals X1 and X2 and generates the internal clock signals which are used in microcomputer 10, for example the system clock on line CLKIN. If a crystal is connected between terminals X1 and X2, clock generator 200 will, by way of an internal oscillator, generate the system clock signal on line CLKIN. Alternatively, an externally-generated clock can be applied to terminal X2, in which case the externally-generated clock signal will generate (possibly via a divide-by-n in clock generator 200, not shown) the system clock signal on line CLKIN. Clock generator 200 further generates clock signals Q1 and Q2, which occur on the first and third quarter-cycles of the period of the clock signal on line CLKIN, however generated; clock signals Q1 and Q2 are used by memory access arbitration logic 206 in controller 14, as described below.

Relative to the fetching of instruction codes and the control of microcomputer 10 responsive to such instruction codes, controller 14 contains program counter 92, instruction register 94, control logic 202, and program counter control logic 204. Program counter 92 is a twenty-four bit register, having an output connected to address lines 34a of program bus 34. The function of program counter 92 is to store the memory address of the next instruction to be fetched, decoded, and executed by microcomputer 10. In an instruction fetch cycle (which occurs during one period of the system clock signal on line CLKIN), the contents of program counter 92 are placed upon address lines 34a of program bus 34 and the one of memories 16, 18 or 20 (or external memory) containing the memory location corresponding to the address signal will present the addressed contents onto data lines 34d of program bus 34; the contents of the memory location having the address contained in program counter 92 constitute the instruction code of the next instruction to be decoded. Instruction register 94 is a thirty-two bit register which is connected to data lines 34d of program bus 34, and which receives the contents of the contents of program counter 92 during the fetch cycle.

During the decode cycle, occurring in the next period of the system clock signal on line CLKIN after the fetch cycle, the contents of instruction register 94 are decoded by control logic 202, to generate control signals going from controller 14 to the functional circuits of microcomputer 10. To accomplish this, a first portion of control logic 202 contains combinatorial logic for decoding the instruction code. Such combinatorial logic (shown as logic 202a in FIG. 4) can be realized in different well-known ways, such as a programmable logic array or a read-only memory. The thirty-two bit instruction code from instruction register 94 is thus decoded by combinatorial logic 202a into multiple output lines. Some of these lines are directly connected to functions outside of control logic 202, such as to program counter control logic 204; other of these lines are input into sequential logic 202b within control logic 202. Sequential logic 202b is operative to control the various functions of microcomputer 10 so as to allow the reading of data operands from memory by CPU 12, and so as to control the execution of the data processing operations on said operands by CPU 12. Sequential logic 202b accomplishes this, of course, by way of additional output lines emanating therefrom. The logic states of the output lines from control logic 202, whether from combinatorial logic 202a or sequential logic 202b, are thus determined by the instruction code received by control logic 202 from instruction register 94. It should be noted that the drawing figures referred to herein do not show the connection of these control lines between controller 14 and such functional circuitry for purposes of clarity.

It is therefore apparent that combinatorial logic 202a in control logic 202 can be decoding an instruction code which was stored in instruction register 94 while controller 14 is causing the fetch of the following instruction from memory. In addition, as is well known in the art, sequential logic 202b is operative to control the operand read for a given instruction simultaneously with the control of the execution of a previously fetched instruction. Accordingly, control logic 202 can be controlling microcomputer 10 in such a manner that portions of four different instruction codes may be carried out simultaneously. Such "pipelining" of the instruction codes will obviously reduce the time required to perform a given sequence of instructions.

Figure 4A:
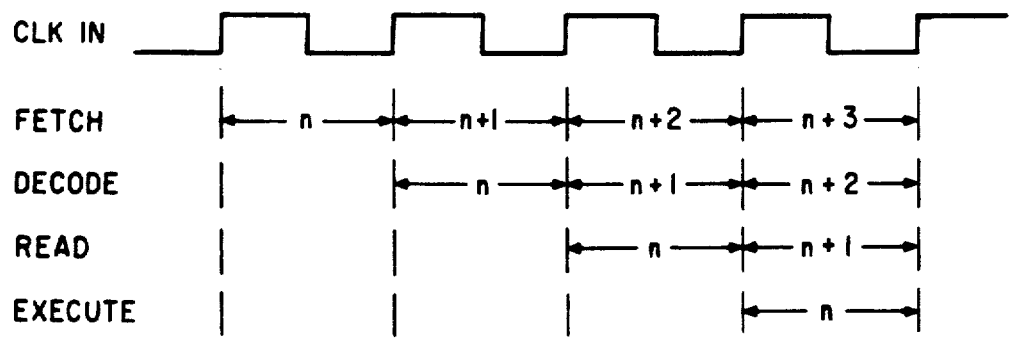
FIG. 4a is a timing diagram illustrating the pipelining of instruction codes performed by the controller of FIG. 4.

FIG. 4a illustrates an example of how the pipeline is filled, and accordingly how the pipeline operates for a typical instruction. In the first cycle of the system clock signal on line CLKIN, instruction n is being fetched by controller 14, for example from one of memories 16, 18 or 20. During the fetch cycle, however, program counter control logic 204 has incremented the contents of program counter 92 to contain the memory location of the instruction code for instruction n+1. During the second cycle of the system clock signal on line CLKIN, the instruction code for instruction n is being decoded by control logic 202. Also during this second cycle, the contents of program counter 92 are presented to address lines 34a of program bus 34, and the instruction code for instruction n+1 are fetched from program memory and loaded into instruction register 94.

During the third system clock cycle shown in FIG. 4a, sequential logic 202b is effecting a read from memory (e.g., RAM 16) of a data operand necessary for instruction n via data bus 30. In addition, since the instruction code for instruction n+1 has been fetched, the third cycle shown in FIG. 4a illustrates that instruction n+1 is being decoded by combinatorial logic 202a of control logic 202. Simultaneously with the read cycle for instruction n, however, the fetch of the instruction code for instruction n+2 is being done, assuming there is no bus or memory conflict with the read cycle for instruction n. As described above, generally the data operand is read by CPU 12 via data bus 30 while the instruction code is read via program bus 34; assuming that both reside in different memories 16, 18 or 20, or one residing in external memory, no bus conflict will occur.

During the fourth cycle of the system clock, instruction n will be executed under the control of sequential logic 202b in control logic 202, the read operation for instruction n+1 will be effected by sequential logic 202b, the instruction code for instruction n+2 will be decoded, and the instruction code for instruction n+3 will be fetched. Accordingly, the pipeline for microcomputer 10 will be filled, and the performance of a sequence of instructions will be optimal, subject to bus conflicts and to memory access conflicts which may, for certain instruction combinations, cause a wait cycle for one of the operations.

Data lines 30d of data bus 30 are received by controller 14, for control of the program flow in other than incremental fashion, such as a branch instruction, requiring that program counter 92 be loaded by CPU 12 or from memory. For example, in the event of an unconditional branch, the value of an operand contained in the instruction code, read from memory, or read from a register in CPU 12 may contain the address of the memory location containing the next instruction code to be executed. Program counter control logic 204 will then receive the value presented upon data lines 30d, and load program counter 92 accordingly, so that program control can pass to the desired location.

As illustrated in FIG. 4, program counter control logic 204 contains an adder 203 which receives the contents of program counter 92. Control logic 202 (preferably combinatorial logic 202a therein), controls adder 203 so that generation of the contents of program counter 92 for the next cycle may be performed in a variety of manners. As explained above, adder 203 may merely increment the prior contents of program counter 92, to step through the instruction sequence. However, program counter control logic 204 further contains an register 205, which can receive a value from data lines 30d of data bus 30. Program counter control logic 204 can thus calculate the contents of program counter 92 in various ways. For example, branching to a relative address (relative to program counter 92) may occur by way of loading register 205 with a value presented on data lines 30d of data bus 30; this value could then be added to the prior contents of program counter 92 to generate a new value for program counter 92. In addition, an absolute branch may be effected by loading register 205 with the desired memory address from data lines 30d of data bus 30, and by control logic 202 causing adder 203 to perform a "zero-add" with the contents of register 205 for application to program counter.

It should be further noted that microcomputer 10 is capable of performing a "delayed" branch instruction, so that the branch instruction is fetched three instructions before it is actually to occur. The delayed branch instruction, when executed, loads register 205 with the destination memory address of the branch as in a direct branch. However, control logic 202 will continue to increment the contents of program counter 92 for the next three instructions following the execution of delayed branch instruction. Upon the third instruction, adder 203 will apply the contents of register 205 to program counter 92, thereby effecting the branch while continuing to take advantage of the pipeline scheme. The pipeline may, of course, remain full after the branch, as the destination location may continue to be incremented as before by adder 203.

Controller 14 further includes interrupt logic 250, which is connected to a plurality of external terminals of microcomputer 10, to controller 14, and to various of the functions within microcomputer 10. Interrupt logic 250 serves the purpose of receiving interrupt signals presented to microcomputer 10 on the RESET terminal and on terminals INTO through INT3, and receiving interrupt signals generated internally to microcomputer 10 from various functions such as serial port 42 and DMA controller 22. An example of such an internal interrupt signal is shown in FIG. 4 by line 312, which is an interrupt signal from DMA controller 22. Contained within CPU 12 as a control register is interrupt enable register 252, which is a memory-mapped addressable register, the contents of which specify whether each of the interrupt signals is enabled or disabled. Responsive to the receipt of an enabled interrupt signal, either from terminals INTO through INT3 or from internal to microcomputer 10, and if controller 14 indicates that an access to an input/output memory location is not current, interrupt logic 250 will cause program counter 92 to be loaded with a memory address corresponding to the particular interrupt signal (the "interrupt vector"), and the execution of the program will continue from the interrupt vector location forward. Responsive to an instruction code generally included in the interrupt handling routine called by the interrupt vector, interrupt logic 250 will generate interrupt acknowledge signals on line INTA for external interrupts and, for example, on line 314 for the internal interrupt signal for DMA controller 22. As is well known in the art for such an operation, controller 14 will cause the prior contents of program counter 92 to be stored in a predetermined memory location (generally called a "stack"), so that the location of the instruction code which would have been fetched next will be reloaded after the interrupt has been serviced.

It is apparent from FIGS. 1 and 2 that the plurality of buses internal to microcomputer 10 can allow the simultaneous access of memories 16, 18 and 20, so long as no two of the buses 30, 34, or 38 are simultaneously accessing the same memory 16, 18 or 20 or simultaneously accessing external memory (via peripheral port 24 or 26). If this is the case, no bus arbitration is required to be enacted by controller 14, and the memory accesses can take place independently.

However, such simultaneous access may be requested, depending upon the instruction codes being executed. Accordingly, to prevent bus conflicts relative to memory access, controller 14 further includes memory arbitration logic 206. Memory arbitration logic 206 receives clock signals Q1 and Q2 from clock generator 200 and receives the address signals on each of the address lines of buses 30, 34 and 38. Memory arbitration logic 206 provides output signals on lines $SEL_{16}$, $SEL_{18}$, $SEL_{20}$ to each of memories 16, 18, and 20, respectively; memory arbitration logic 206 further generates the signals on lines $SEL_{24}$ and $SEL_{26}$ to peripheral ports 24 and 26, respectively. The purpose of memory arbitration logic 206 is to control the access to memories 16, 18 and 20, and external and input/output memories, according to a predetermined priority.

For purposes of the following examples, the priority will be presumed to be in the order of address lines 30a and 30b of data bus 30 having the highest priority, followed by address lines 34a of program bus 34, and followed by address lines 38a of DMA bus 38 with the lowest priority. This priority is chosen because of the construction of microcomputer 10, specifically CPU 12; the parallel connection of multiplier 46 and ALU 48 means that, for the digital signal processing applications intended for microcomputer 10, it is most likely that performance would be more significantly impacted if data communications were forced to wait because of instruction fetches, than vice versa. DMA operations can take lowest priority because of the minimal overall performance impact for most application programs resulting from slower DMA relative to the other operations. It should be noted, however, that other applications of the instant invention would be more favorably performed if the priority were altered. For example, for graphics applications, DMA may best be prioritized at the highest level if used to provide the video display refresh function. Accordingly, the priority illustrated herein is by way of example only.

Figure 5:
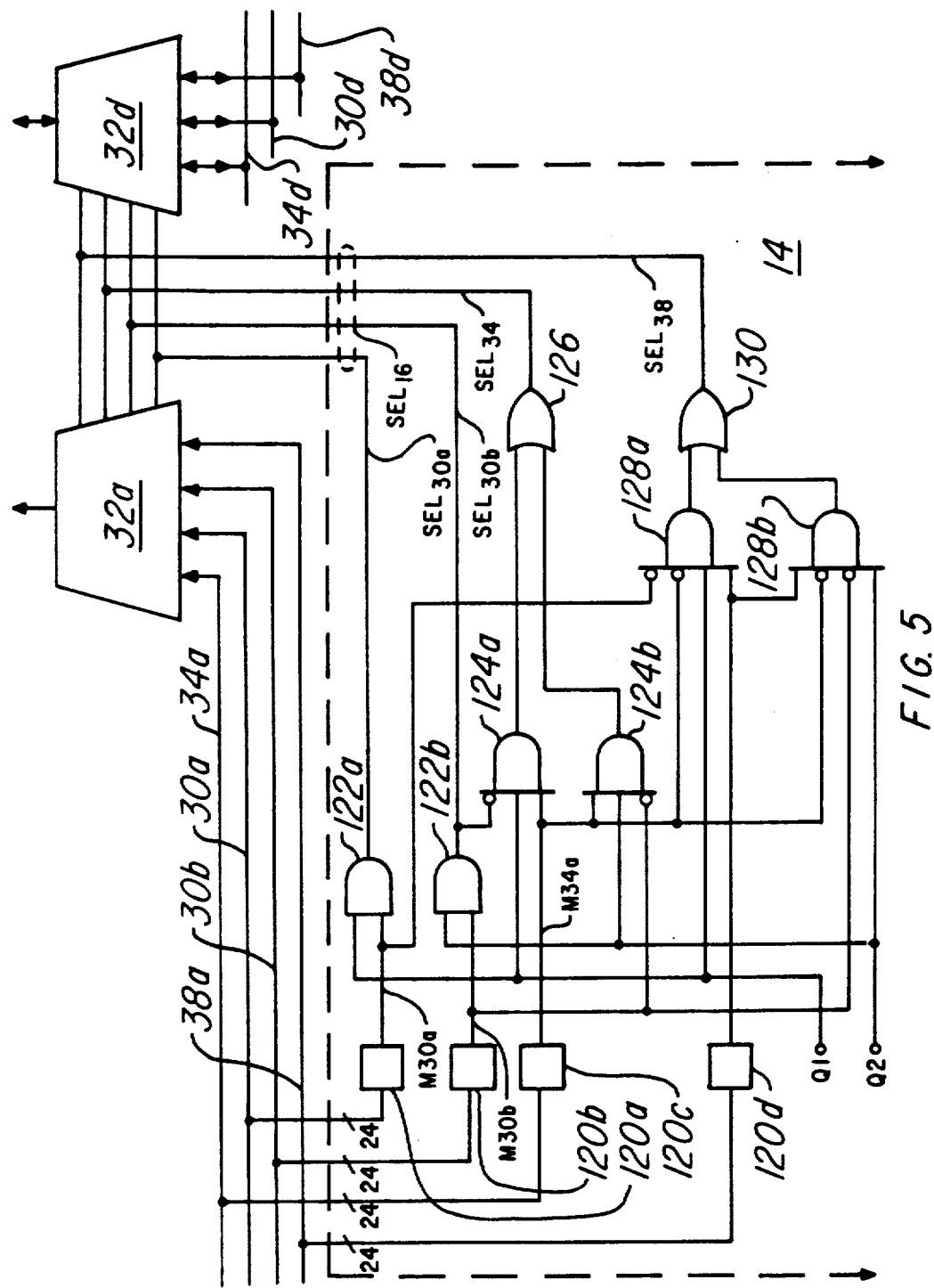
FIG. 5 is an electrical diagram, in schematic form, of logic within the controller of FIG. 4, useful in the arbitration of accesses to various memory entities within the microcomputer of FIG. 1.

Referring now to FIG. 5, the control of one of memory ports 32a by memory arbitration logic 206 within controller 14 illustrated. As described above relative to FIG. 1, each of memory ports 32a is connected to receive address signals from sets of address lines 30a and 30b of data bus 30, from address lines 34a of program bus 34, and from address lines 38a of DMA bus 38. Memory port 32a, as illustrated in FIG. 5, performs primarily a multiplexer function, as it receives said address lines at its inputs and connects the selected one of the address line sets to the decoder 33 of its associated memory 16, 18 or 20, responsive to signals from controller 14.

FIG. 5 is a logical schematic of a portion of memory arbitration logic 206 within controller 14 which controls one pair of ports 32a and 32d; by way of example, ports 32a and 32d shown in FIG. 5 are associated with RAM 16. As described above, a single memory address space is utilized by microcomputer 10 for all of the memories 16, 18 and 20 within microcomputer 10, and including the addresses of memory external to microcomputer 10 and accessible via peripheral ports 24 and 26. It should be recalled that the memory address space of microcomputer 10 is 16 Mwords ($2^{24}$ words, due to the twenty-four bits carried on each set of address lines in buses 30, 34 and 38). Using this single memory space, Table 4 shows the memory map of microcomputer 10 according to the preferred embodiment of the instant invention.

TABLE 4

| Address range (hexadecimal) | Location/Function |
| --- | --- |
| 000000 through 00003F | Interrupt handling |
| 000040 through 000FFF | ROM 20 |
| 001000 througn 7FFFFF | External memory |
| 800000 through 800FFF | I/O & other memory mapped registers |
| 801000 through 8013FF | RAM 16 |
| 801400 through 8017FF | RAM 18 |
| 801800 through FFFFFF | External memory |

As stated above, the memory address space which refers to I/O and memory mapped registers is directed to peripheral port 26 (including, as will be discussed below, registers addressable by way of peripheral bus 28, including those in DMA controller 22, timer 40, serial port 42 and format converter 44), while the external memory access is generally handled via peripheral port 24.

Within memory arbitration logic 206 are decoders 120a through 120d which, for its associated one of the sets of address lines 30a, 30b, 34a and 38a, decodes sufficient ones of address lines therein to determine if the address value specified on the associated address lines has a value in the range for the given one of memories 16, 18 and 20 controlled thereby. For purposes of an example, assume that the one of ports 32a shown in FIG. 5 is associated with RAM 16; accordingly, port 32a of FIG. 5 should be responsive to an address value on one of the sets of address lines 30a, 30b, 34a or 38a which is between $801000_h$ and $8013FF_h$. It should be noted, of course, that one of ordinary skill in the art could design decoders 120a through 120d in such a manner as to take advantage of the "don't care" values of the least significant ten bits of the address lines. The output of each of decoders 120 is a logic "1" in the illustrated example of FIG. 5 in the event that the address lines connected thereto is within the range $801000_h$ and $8013FF_h$. The output lines from decoders 120a through 120d are M30A, M30B, M34A and M38A respectively, designating the presence or absence of a match between the address and the memory address space associated with RAM 16.

As described above, clock generator 200 of controller 14 generates two clock signals Q1 and Q2 which are utilized in the control of ports 32a. As discussed above, the system clock for microcomputer 10 corresponds to the clock signals on line CLKIN. Clock signals Q1 and Q2 are each associated with a phase of the system clock on line CLKIN. Clock signal Q1 is a "1" during the first quarter-cycle of the system clock, and clock signal Q2 is a "1" during the third quarter-cycle of the system clock. Memory arbitration logic 206 shown in FIG. 5 uses these two clock signals Q1 and Q2 in order to time-multiplex the address signals on sets of address lines 30a and 30b with one another. Signal M30A shown in FIG. 5 is connected to a first input of AND gate 122a, while clock signal Q1 is connected to the second input of AND gate 122a. The output of AND gate 122a is therefore a "1" only when the address presented on address lines 30a of data bus 30 is within the memory space of RAM 16 (in the illustrated example) during the first quarter-cycle of the system clock. The output of AND gate 122a is connected to port 32a, and is designated SEL30A; port 32a is operable to select address lines 30a of data bus 30 for application to decoder 33 of RAM 16 responsive to line SEL30A in its "1" logic state. Conversely, line SEL30B is connected to the output of AND gate 122b, which performs the logical AND of the output of decoder 120b and clock signal Q2. Port 32a therefore only selects address lines 30b for application to decoder 33 of RAM 16 when the value on address lines 30b is between $801000_h$ and $8013FF_h$ during the third quarter-cycle of the system clock. It is therefore apparent from this description and from FIG. 5 that sets of address lines 30a and 30b of data bus 30 can never create a conflict for being directed to the same memory 16, 18 or 20 (or external) during a given cycle because of the time-multiplexing of the two addresses within a cycle performed by controller 14 as shown in FIG. 5. It should also be apparent that the addresses on sets of address lines 30a and 30b are at the highest priority, relative to the address lines in program bus 34 and DMA bus 38, since the value of the address values on buses 34 and 38 are not considered in the generation of the "1" logic state on lines SEL30A and SEL30B by controller 14.

Such priority control is enabled by controller 14 relative to address lines 34a of program bus 34, and address lines 38a of DMA bus 38. Decoder 122c which receives address lines 34a of program bus 34 at its input, and generates a "1" logic state on line M34A responsive to the address value being between $801000_h$ and $8013FF_h$, similarly as decoders 122a and 122b. Line M34A is connected to one input of each of AND gates 124a and 124b, which generates a signal at its output corresponding to the logical AND of its three inputs. A second input of AND gate 124a is connected to clock signal Q1, and a third, inverted, input of AND gate 124a is connected to line M30A; accordingly, the output of AND gate 124a is at a "1" logic state corresponding to the address value on address lines 34a corresponding to a memory location in RAM 16 (in this example) during the first quarter-cycle of the system clock, if and only if the address value of address lines 30a of data bus 30 does not so correspond to a RAM 16 memory location. This "1" logic state is applied to port 32a on line SEL34, indicating that address lines 34a of program bus 34 is to be selected for application to RAM 16, via OR gate 126. The application of address lines 34a to RAM 16 by port 32a is similarly enabled by AND gate 124b, so long as line M30B is low (i.e., the address on address lines 30b corresponds to a memory location outside of the memory space for RAM 16).

The selection of address lines 38a of DMA bus 38 by port 32a is enabled by a "1" logic state on line SEL38. Similarly as the "1" logic state on line SEL34, the "1" logic state on line SEL38 is generated by way of decoder 120d (having line M38A at its output which has a "1" logic state when the address value of lines 38a are within the address space of RAM 16), AND gates 128a and 128b, and OR gate 130. AND gates 128a and 128b each have a fourth, inverted, input, however, which is connected to line M34A from the output of decoder 120c. Accordingly, the selection of address lines 38a of DMA bus 38 is at even a lower priority than address lines 34a of program bus 34, since in order to generate a "1" state on line SEL38, both the address value on address lines 30a (or 30b, depending upon which quarter-cycle is current) of data bus and the address value on address lines 34a must not correspond to a memory location within RAM 16 (in this example).

As shown in FIG. 5, port 32d is similarly enabled by lines $SEL_{16}$ (i.e., lines SEL30A, SEL30B, SEL34, and SEL38) to select the proper data lines of data bus 30, 34 or 38 for connection to the corresponding memory (in this example, RAM 16). Since data lines 30d are accessed by both address lines 30a and address lines 30b of data bus 30, lines SEL30A and SEL30B are ORed for purposes of the selection of data lines 30d of data bus 30. It should also be noted that ports 32a and 32d are each tri-stated in the event that none of the address lines 30a, 30b, 34a or 38a are within the address space of the corresponding memory. This precludes the associated memory from interfering with data lines 30d, 34d, or 38d when not selected.

As shown above in FIGS. 1 and 4, memory arbitration logic 206 in controller 14 generates select outputs via lines $SEL_{18}$ and $SEL_{20}$ to ports 32a and 32d of memories 18 and 20, respectively. In addition, memory arbitration logic 206 provides select outputs via lines $SEL_{24}$ and $SEL_{26}$ to peripheral ports 24 and 26 in a fashion similar as that described hereinabove relative to FIG. 5. Within peripheral ports 24 and 26, multiplexers 100, 102, 106 and 108 of FIG. 3 are enabled based on the same priority scheme, depending upon the address values on said address lines 30a, 30b, 34a and 38a.

Control of read and write operations for the various memory devices is accomplished by way of certain of the control outputs from sequential logic 202b in control logic 202 of controller 14, shown in FIG. 4. This function, as the other control functions performed by controller 14, occurs responsive to the instruction codes received and decoded by controller 14.

Figure 5A:
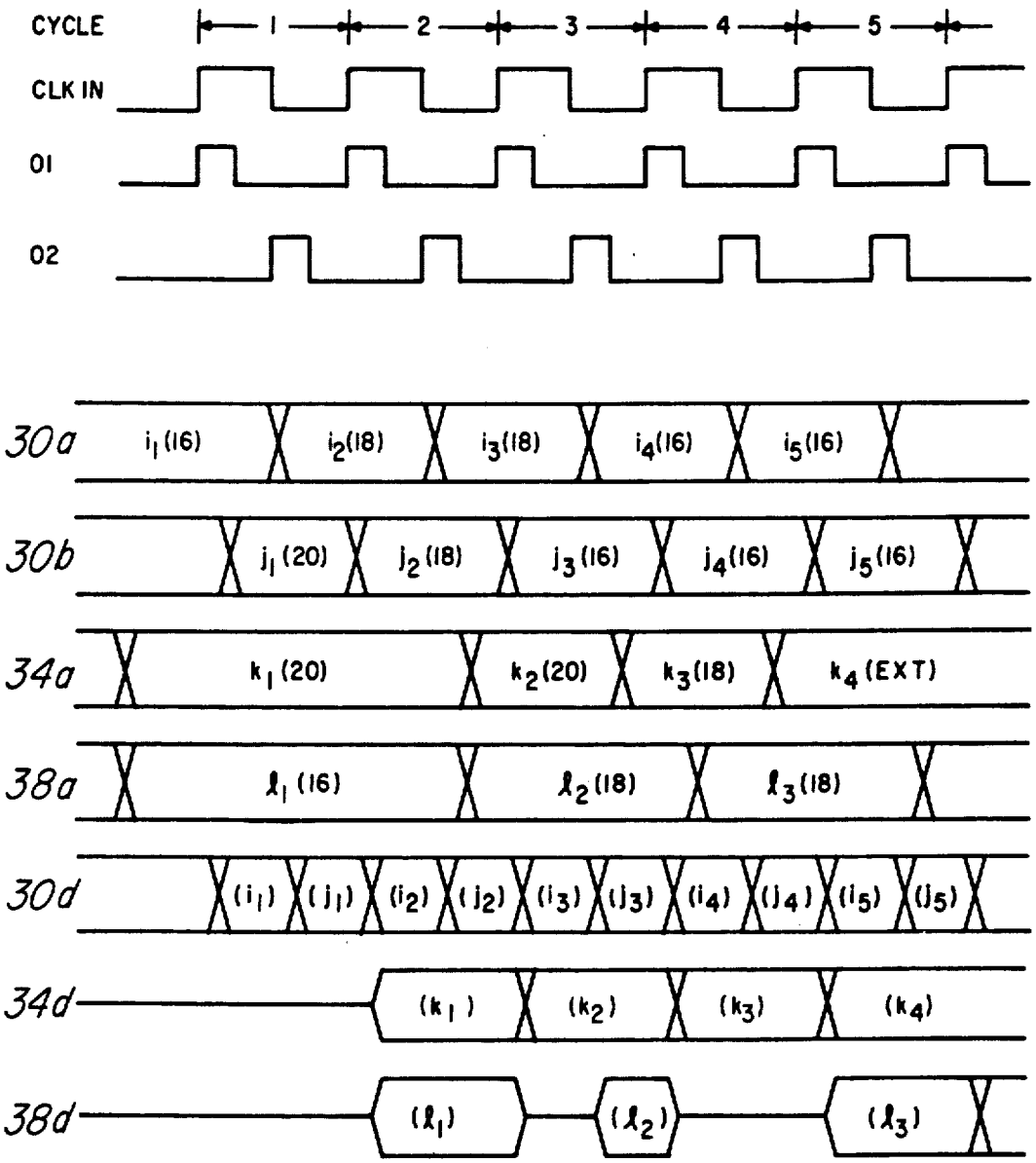
FIG. 5a is a timing diagram of memory accesses performed within the microcomputer of FIG. 1, illustrating the operation of the logic of FIG. 5.

Referring now to FIG. 5a, the timing and prioritization of a series of memory accesses is shown in order to illustrate the parallel and dual access features of the instant invention. The top line of FIG. 5a illustrates the operation of the system clock signal on line CLKIN, with the cycles numbered for ease of correlation with the description hereinbelow. Clock signals Q1 and Q2 are illustrated as described hereinabove, with clock signal Q1 active during the first quarter-cycle of the system clock period, and with clock signal Q2 active during the third quarter-cycle of the system clock period. For purposes of clarity, the examples illustrated in FIG. 5a are all read accesses to the various memories. It should be noted that write accesses to RAMs 16 and 18, and to external memory, are prioritized and granted in the same way as the read accesses shown in FIG. 5a, only with the memories responsive to writing in the value of the associated data lines.

During the first cycle of system clock CLKIN shown in FIG. 5a, address lines 30a are carrying an address value $i_1$, which corresponds to a memory location in RAM 16; similarly, address lines 30b are carrying an address value $j_1$, which corresponds to an address value in ROM 20. Responsive to clock signal Q1 active, RAM 16 presents the contents of memory location $i_1$ on data lines 30d of data bus 30. Responsive to clock signal Q2 active in the third quarter-cycle of system clock CLKIN, ROM 20 presents the contents of memory location $j_1$ on data lines 30d of data bus 30. Of course, since address lines 30a and 30b are referring to different memories, no conflict arises therebetween.

Also during the first cycle of system clock CLKIN shown in FIG. 5a, address lines 34a of program bus 34 are carrying an address value $k_1$ which also corresponds to a memory location in ROM 20. Since address lines 30b of data bus 30 have priority over address lines 34a of program bus 34, ROM 20 is not responsive to address lines 34a since address lines 30b are granted access to ROM 20. Accordingly, data lines 34d of program bus 34 remain in a high-impedance state, since no other memory is accessed by address value $k_1$, and since RAM 20 is accessed instead by address lines 30a and 30b. Similarly during the first cycle, address lines 38a of DMA bus 38 are carrying address value $l_1$ which corresponds to a memory location in RAM 16; since address lines 38a have a lower priority than address lines 30a of data bus 30, data lines 38d of DMA bus 38 are also in a high-impedance state. Since a conflict in the attempted access of a single memory device by two of buses 30, 34 and 38 has occurred, controller 14 will cause, via control logic 202, the desired memory address of the lower priority bus to continue to be presented, so that as soon as access to the memory can be granted, the execution of the program will begin again from the same point for the one of buses 34 or 38 denied access.

In the second cycle shown in FIG. 5a, address lines 30a and 30b present address values $i_2$ and $j_2$, respectively, to RAM 18; accordingly, data lines 30d are presented with the contents of memory locations $i_2$ and $j_2$ responsive to clock signals Q1 and Q2, as in the first cycle. No conflict occurs because of address lines 30a and 30b both referring to RAM 16, since the separate sets of address lines 30a and 30b are controlled, by operation of controller 14 as described relative to FIG. 5, to be presented to RAM 16 at separate times within the system clock period. Address lines 34a of program bus 34 continue to carry address value $k_1$ which corresponds to a memory location in ROM 20; since address lines 30a and 30b are accessing RAM 16, program bus 34 is then granted access to ROM 20, and responsive to clock signal Q1, the contents of memory location $k_1$ in ROM 20 are presented on data lines 34d of program bus 34. Also during the second cycle shown in FIG. 5a, address lines 38a of DMA bus 38 continue to carry address value $l_1$ corresponding to a memory location in RAM 16; since neither data bus 30 nor program bus 34 has been granted access to RAM 16, RAM 16 presents the contents of memory location $l_1$ on data lines 38d of DMA bus 38, responsive to clock signal Q1. It is therefore apparent that microcomputer 10, constructed according to the instant invention, is capable of having three parallel accesses to three different memory locations occurring simultaneously. Taking into consideration the intra-cycle multiplexing of sets of address lines 30a and 30b of data bus 30, the capability of four memory accesses within a single system clock cycle may be performed.

The third cycle of system clock CLKIN illustrated in FIG. 5a shows the effect of address lines 30a of data bus 30 taking priority over address lines 38a of DMA bus 38. As clock signal Q1 goes active, both address lines 30a and address lines 38a are carrying address values within the address space of RAM 18 (values $i_3$ and $l_2$, respectively). Accordingly, data bus 30 is granted access to RAM 18 over DMA bus 38; data lines 30d of data bus thus are presented with the contents of memory location $i_3$, while data lines 38d of DMA bus 38 go to a high-impedance state. However, upon clock signal Q2 going active, address lines 38a of DMA bus are granted access to RAM 18, since address lines 30a of data bus 30 are granted access only responsive to clock signal Q1. Since address lines 30b are carrying address value $j_3$ corresponding to a memory location in RAM 16, address lines 38a access RAM 18, so that data lines 38d are presented with the contents of memory location $l_2$ of RAM 18 responsive to clock signal Q2.

In the fourth cycle shown in FIG. 5a, address lines 34a are carrying address value $k_3$, which correspond to a memory location in RAM 18; similarly, address lines 38a are carrying address value $l_3$, also corresponding to a memory location in RAM 18. As described above, program bus 34 is granted priority over DMA bus 38. Accordingly, responsive to clock signal Q1, data lines 34d of program bus 34 are presented with the contents of memory location $k_3$ of RAM 18, while data lines 38d of DMA bus 38 are in their high-impedance state. The fifth cycle shown in FIG. 5a illustrates that external memory can be accessed by address lines 34a, carrying an address value $k_4$ corresponding to a memory location in external memory; DMA bus 38 and data bus 30 are active simultaneously with the access of external memory by program bus. As described above, the external memory access will occur by way of peripheral port 24; as will be described below, during a DMA operation, peripheral port 26 will be disabled.

In addition, it should be noted that the source of the address and data information, and the destination of the data, sought by said buses 30, 34 and 38 is not specified in the above description relative to FIGS. 5 and 5a. As described above, however, one of the primary functions of controller 14 in its decoding and execution of instruction codes is to control the various functional blocks of microcomputer 10 so that no two functional blocks (e.g., peripheral port 24 and CPU 12) attempt to take control of the same bus (e.g., data bus 30). Such bus control and arbitration at the end of the bus away from the memories 16, 18 and 20 (or external memory) is performed by controller 14 in a manner which is well known in the art, and which is performed in many general and special purpose microprocessors and microcomputers currently available.

It is therefore apparent from the description hereinabove that various combinations of memory utilization may be effected within the single address space of microcomputer 10. This is made possible by the accessibility of each of the various memory entities (i.e., RAM 16, RAM 18, ROM 20 and external memory) by each of the three buses 30, 34 and 38. Accordingly, while controller 14 addresses and receives the instruction codes by way of program bus 34, such addresses may reside in RAM 16 along with the data memory accessible by CPU 12 using data bus 30. This organization therefore makes possible a von Neumann application for microcomputer 10, by using a single memory (e.g., RAM 16) as both program and data memory, with no partitioning required within RAM 16 to effect this operation. However, microcomputer 10 can also be utilized in a Harvard configuration by storing program memory in ROM 20, for example, and by storing data memory in RAM 16. Controller 14 can then access ROM 20 for instruction codes concurrently with CPU 12 accessing RAM 16 for data operands, thereby achieving the performance improvement of a Harvard machine, in return for partitioning memory accordingly. In addition, some benefits of both a von Neumann and a Harvard configuration can be achieved by using a single memory such as RAM 16, because of the dual access feature of microcomputer 10. The dual access feature allows two accesses in a single system clock cycle, even to the same memory, because of the time-multiplexed feature used by data bus 30. This allows the same physical memory space to be used for both data and program memory, while still achieving the performance advantage of two separate memories. It should also be apparent that, besides being configurable into the two configurations, microcomputer 10 can be so reconfigured dynamically, so that certain tasks may be performed in a von Neumann manner and certain other tasks in a Harvard manner. Accordingly, microcomputer 10 constructed according to the instant invention allows the user to optimize microcomputer 10 based upon the desired application.

Referring now to FIGS. 6a through 6d, the operation of CPU 12 in the execution of an instruction will be explained in detail. The exemplary instruction described herein is a parallel multiply and add, as such an instruction is illustrative of an instruction which is repetitively used in digital signal processing applications and for which microcomputer 10 is specially designed to perform. In addition, the parallel multiply and add instruction is illustrative of the primary features of CPU 12 in the preferred embodiment of microcomputer 10, constructed according to the invention. For purposes of the example described herein, it will be assumed that the instruction code resides in ROM 20, and that the data operands reside in RAM 16; as discussed above, of course, microcomputer 10 is constructed so that both the instruction codes and data operands reside in the same memory block, or in any other configuration. The multiply of the instruction explained herein will multiply the contents of a memory location addressed by auxiliary register 54a using the indirect post-displacement add and modify addressing mode (see Table 1), with the contents of a memory location addressed by auxiliary register 54h using the indirect post-displacement subtract and modify mode, and will store the results in data register 50a; the displacement used has a value of one. This multiplication is in parallel with the addition of the contents of data register 50a with the contents of data register 50e, and the storing of the sum in data register 50e.

Figure 6A:
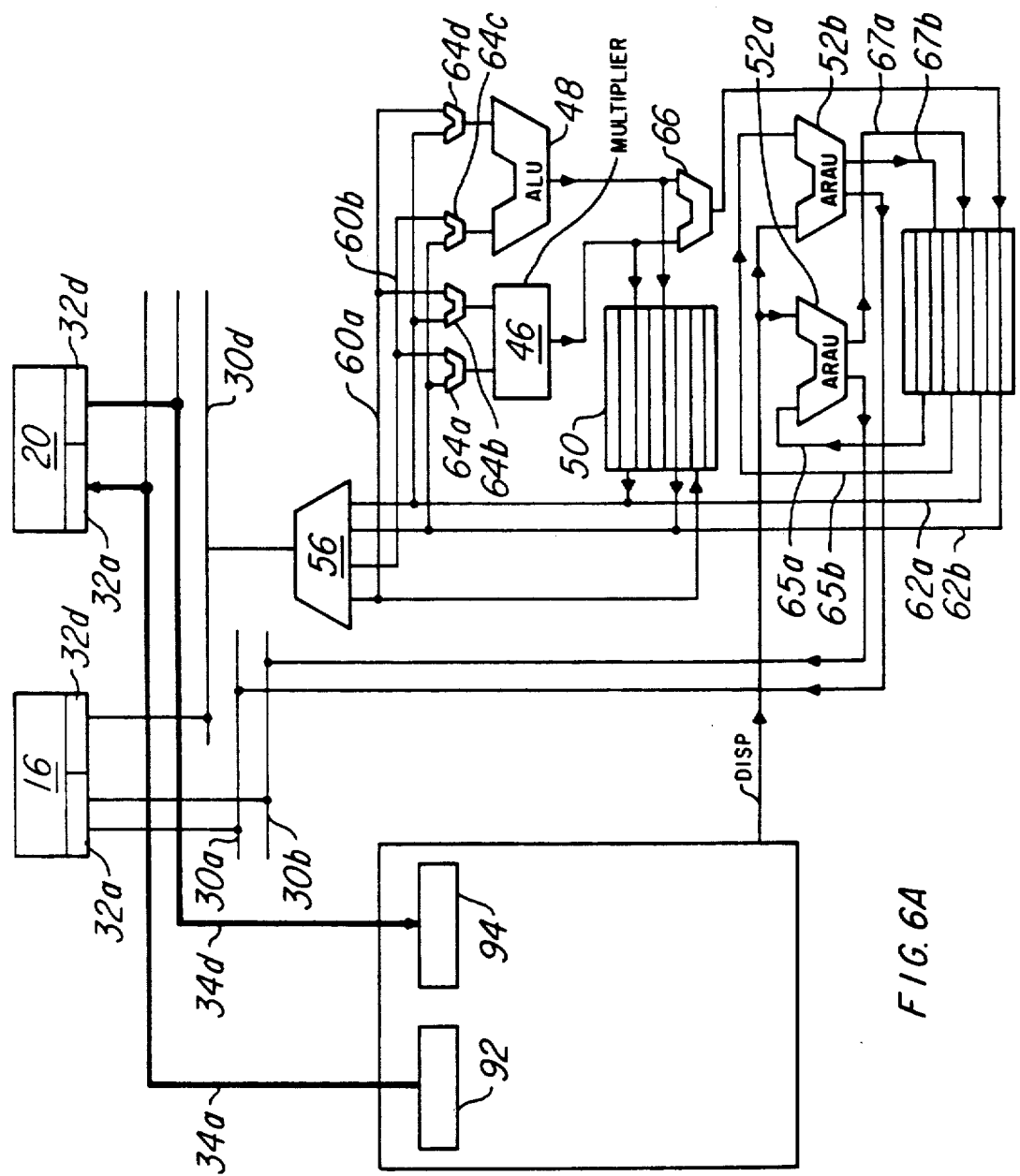
FIGS. 6a through 6d are electrical diagrams, in block form, of portions of the microcomputer of FIG. 1, showing snapshots in time of the execution of an exemplary instruction.

FIG. 6a illustrates the operation of CPU 12, controller 14, ROM 20 and RAM 16 and interconnecting buses 30 and 34, during the fetch cycle of the instruction code for the above-described parallel multiply and add operation. The bold arrows in FIG. 6a indicate the paths along which signals active in the illustrated operation are traveling. As shown in FIG. 6a, the contents of program counter 92 in controller 14 are presented onto address lines 34a of program bus 34; presuming no conflict arises by way of data bus 30 accessing ROM 20, the contents of the memory location in ROM 20 corresponding to the contents of program counter 92 are presented onto data lines 34d of program bus 34, and stored in instruction register 94.

Figure 6B:
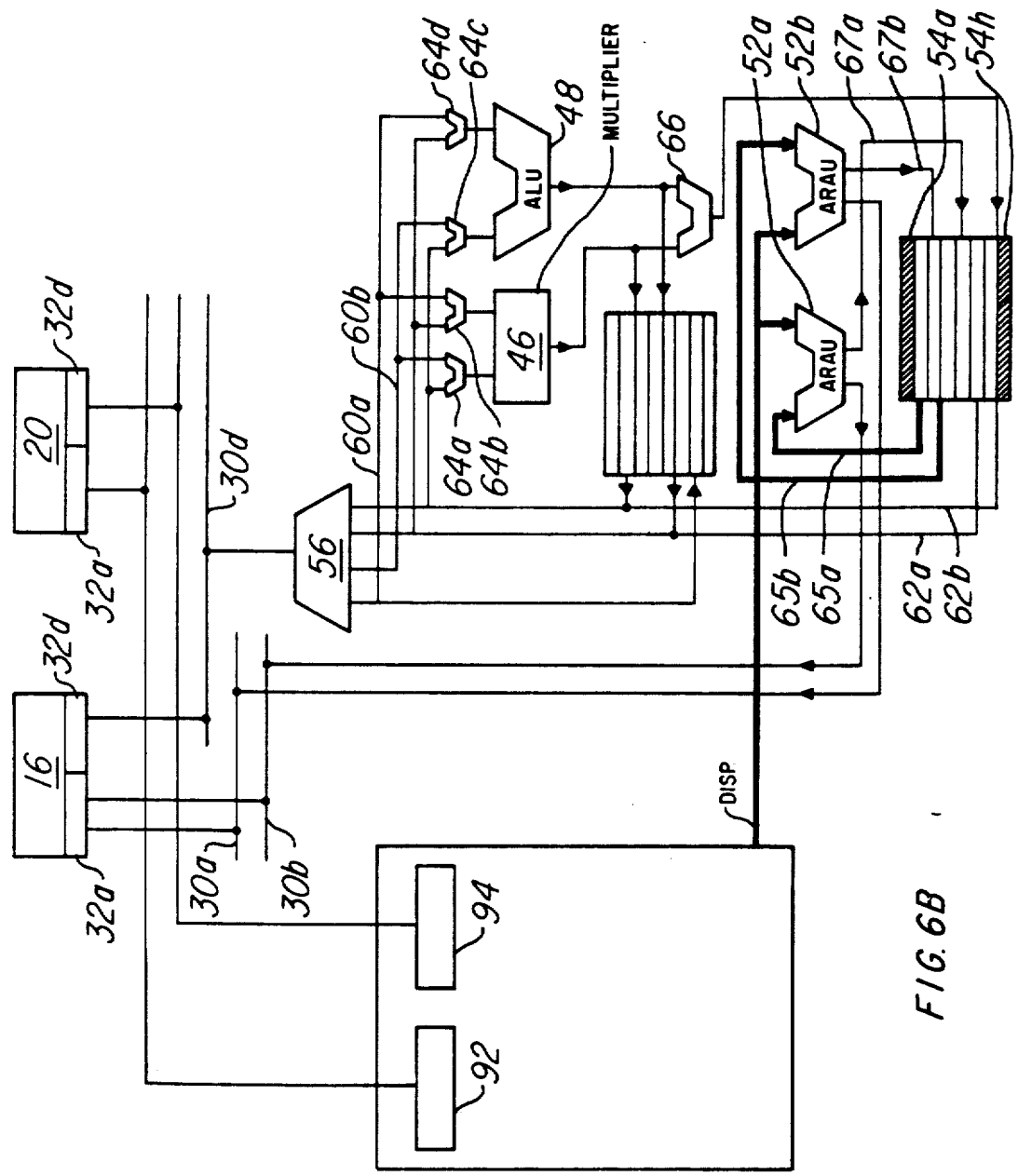

FIG. 6b illustrates the operation of microcomputer 10 during the decoding cycle of the parallel multiply-and-add. During this cycle, controller 14 enables the generation of the memory addresses for the operands of the multiplication. Accordingly, the contents of auxiliary register 54a are presented to auxiliary register bus 65a while the contents of auxiliary register 54h are presented to auxiliary register bus 65b. Controller 14 is at this time also presenting a "1" as a displacement to both ARAUs 52a and 52b.

Figure 6C:
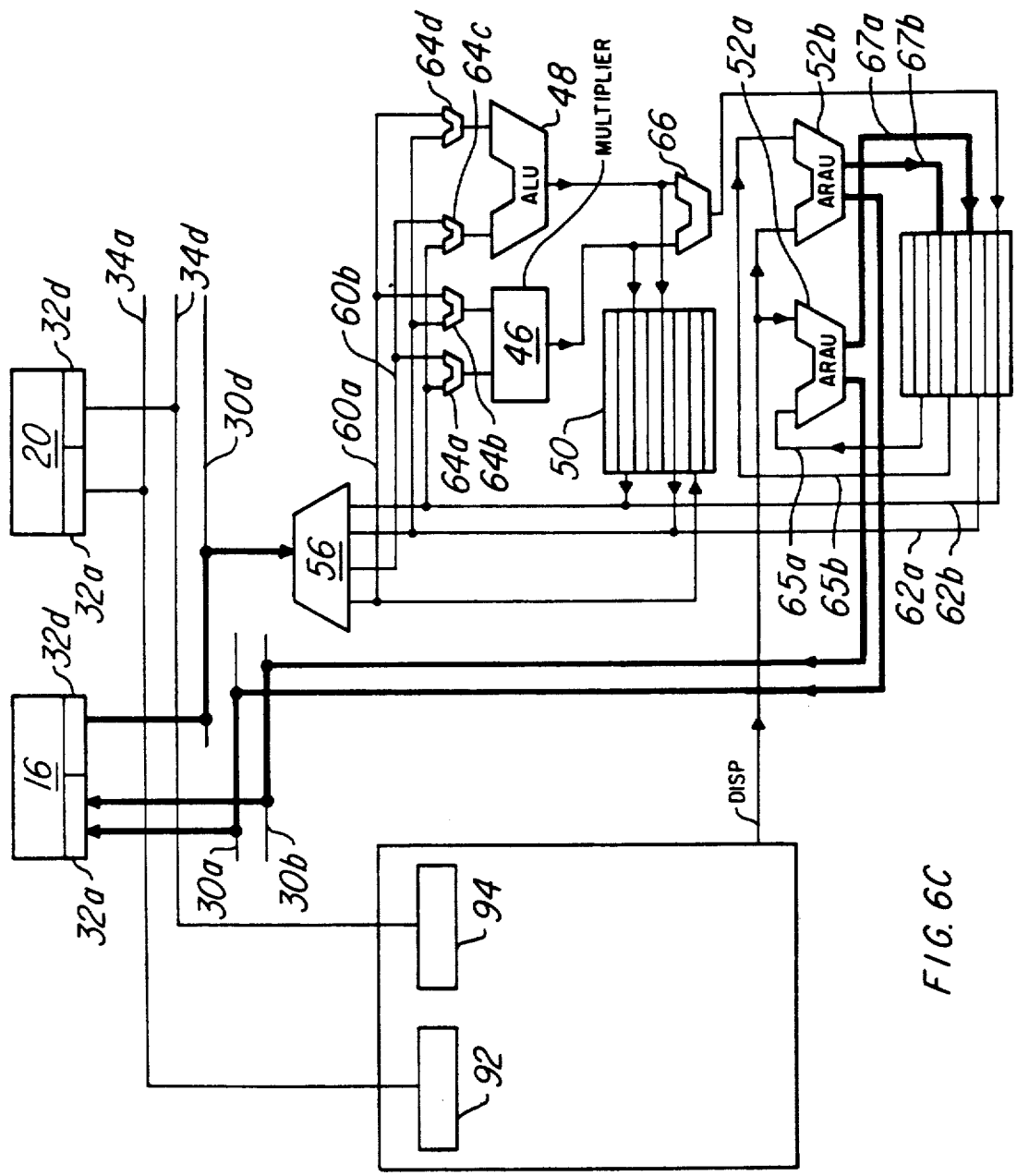

Referring to FIG. 6c, the results of the operation by ARAUs 52a and 52b, and the performance of the read cycle, are illustrated. ARAU 52a adds the displacement to the contents of auxiliary register 54a, and presents the sum to address lines 30a of data bus 30, and restores the incremented value to auxiliary register 54a via bus 67a. Similarly, ARAU 52b subtracts the displacement from the contents of auxiliary register 54h, presents the difference to address lines 30b of data bus 30, and restores the decremented value of auxiliary register 54h via bus 67b. As described above, data bus 30 has the highest priority in microcomputer 10 for access of memories. During this cycle, the memory addresses generated by ARAUs 52a and 52b are presented to RAM 16 during the first and third quarter-cycles of the system clock period. Accordingly, the contents of the corresponding memory locations appear on data lines 30d in time-multiplexed fashion as is described relative to FIGS. 5 and 5a.

Figure 6D:
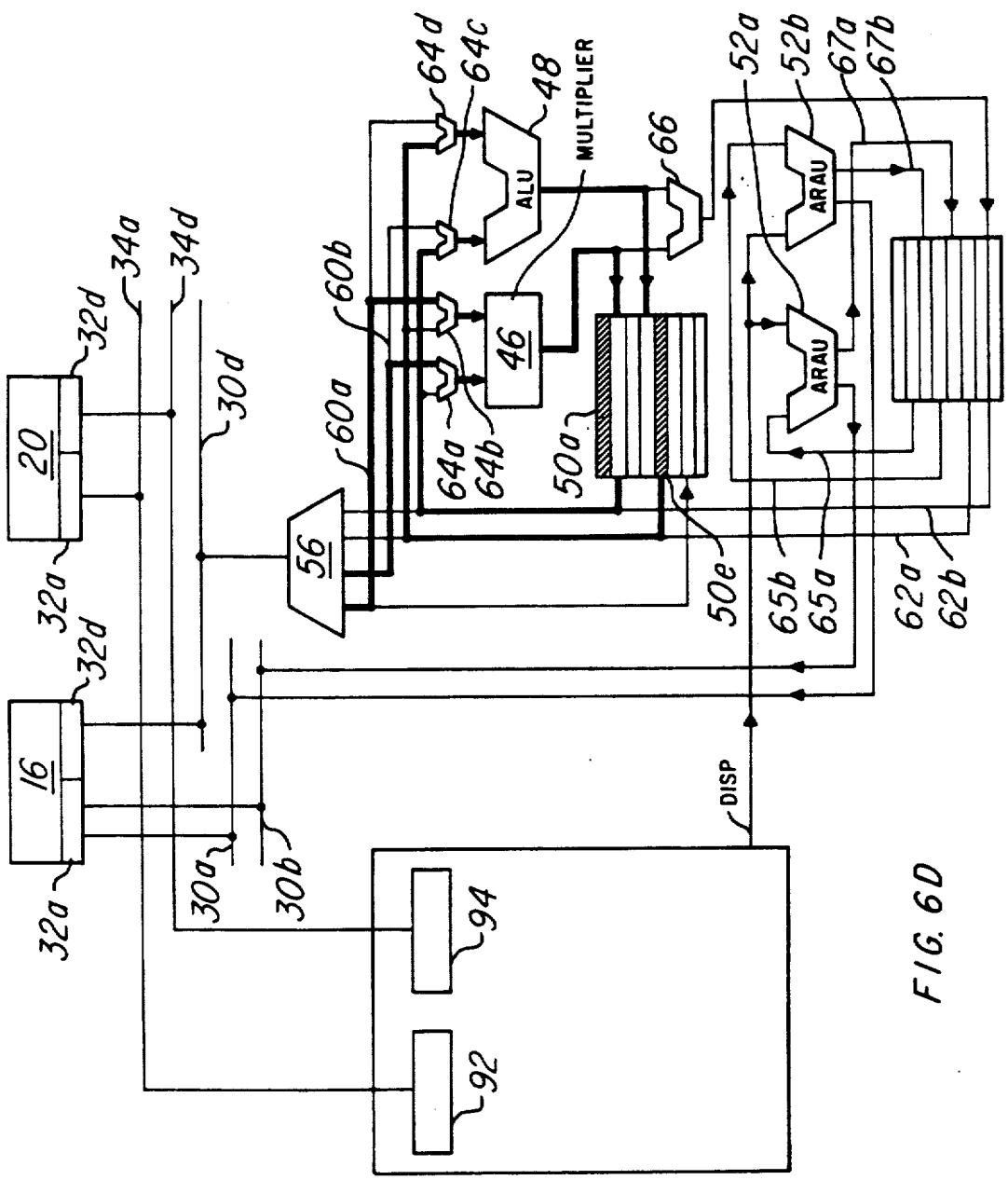

At the end of the read cycle, the multiplicands read from RAM 16 are latched and retained by data bus controller 56. Referring now to FIG. 6d, data bus controller 56 connects the latched values received on lines 30d of data bus 30 during the read cycle to CPU bus 60a and to CPU bus 60b, corresponding to the addresses generated by ARAUs 52a and 52b, respectively. As a result, during the execution cycle CPU bus 60a will present to multiplier 46 the contents of the memory location generated by ARAU 52a, and CPU bus 60b will present to multiplier 46 the contents of the memory location generated by ARAU 52b. Multiplexers 64a and 64b are enabled accordingly by controller 14, responsive to the instruction code decoded in the decode cycle.

FIG. 6d illustrates the execution cycle for the parallel multiply and add cycle described herein. The contents of data registers 50a and 50e are presented to ALU 48 via register buses 62a and 62b, respectively; register buses 62a and 62b are connected to the inputs of ALU 48 by multiplexers 64c and 64d, respectively, by controller 14. Upon receiving these inputs during the execution cycle, ALU 48 performs the addition of the two values, and stores the sum in data register 50e. Also during the execution cycle of the instruction, multiplier 46 multiplies the values presented by CPU buses 60a and 60b, and stores the result in data register 50a. The parallel multiply-and-add instruction is thus complete at the end of the execution cycle.

This parallel multiply-and-add instruction is itself a "pipelined" technique useful in repetitive multiply and accumulate operations necessary in digital signal processing applications. In this instruction data register 50a is serving as an intermediate accumulator and data register 50e is serving as the accumulator for the final results. This is apparent from the addition occurring in parallel with the multiplication; since the multiplication is not yet occurred, the value in data register 50a used in the addition by ALU 48 is the result of the prior multiplication. The result of the multiplication by multiplier 46 is stored in data register 50a, and is added to the accumulated result in data register 50e during the execution cycle of the next parallel multiply-and-add instruction (or, of course, during a standard add instruction). Accordingly, performance by microcomputer 10 of n repeated parallel multiply-and-add instructions requires approximately n fewer cycles of the system clock period than if the accumulation of the multiplication product did not occur in parallel with the multiplication. Accordingly, the construction of CPU 12 allows for substantial improvement in digital signal processing performance, especially when utilized in conjunction with the instruction pipelining feature described above relative to controller 14.

As discussed above, external memory devices connected to peripheral port 24, for example, can be used to store the instruction codes for the program being executed by microcomputer 10. However, the access time of the external memory may be sufficiently slower than that of memories 16, 18 and 20 so that controller 14 would have to wait a full system clock period after presenting the contents of program counter 92 on address lines 34a of program bus 34, before the instruction code would be presented by the external memory onto data lines 34d of program bus 34 for receipt by instruction register 94. It is well known that, for any given instruction being executed, often the next instruction code to be executed is located in a memory location in program memory which has an address close to the address of the given instruction. Such proximity in program memory of the next instruction code occurs especially often in digital signal processing applications, because of the repetitive nature of the calculations therein. This can be taken advantage of by use of an instruction cache such as instruction cache 36 described herein with reference to FIG. 7.

Figure 7:
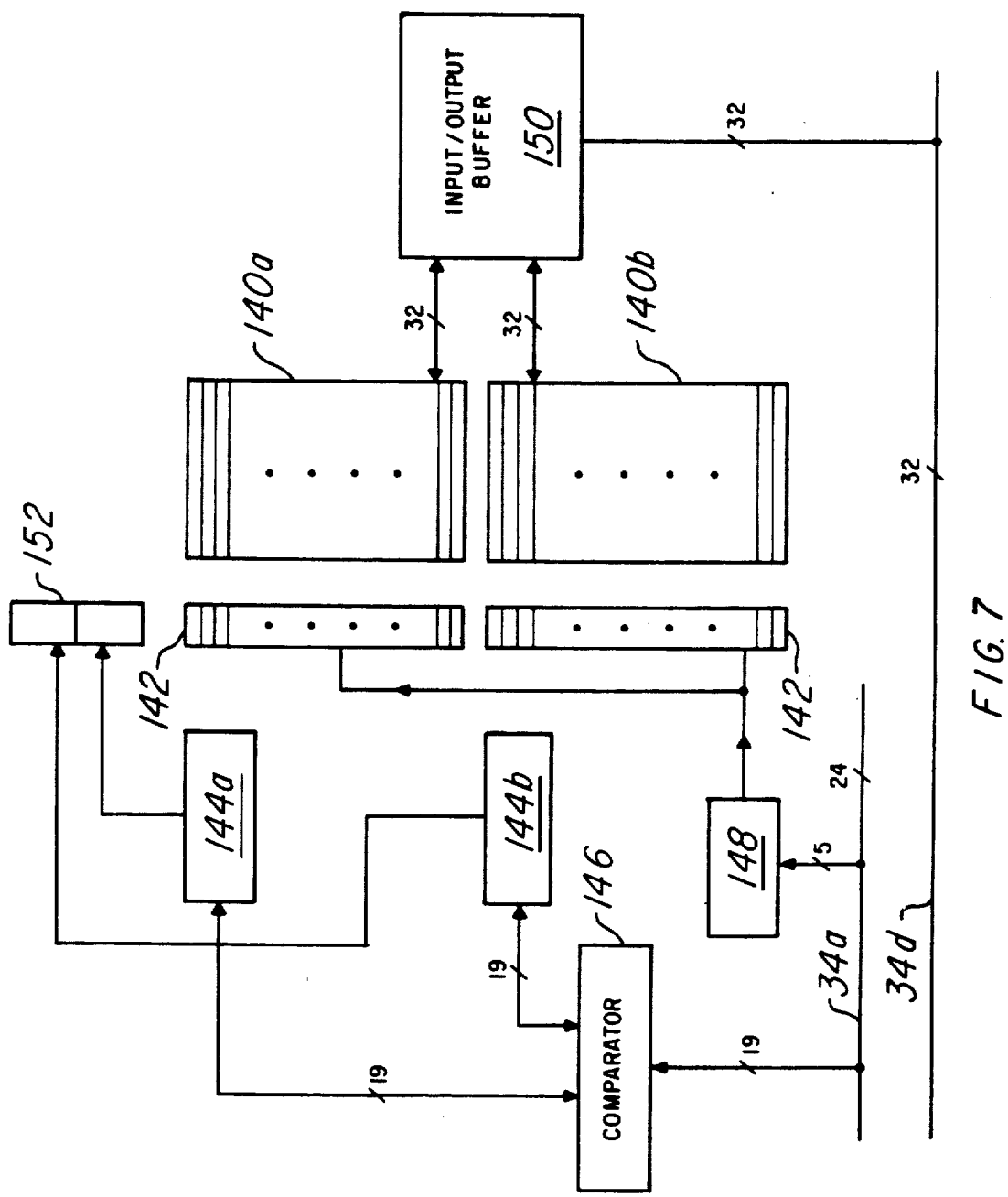
FIG. 7 is an electrical diagram, in block form, of the instruction cache of the microcomputer of FIG. 1.

Instruction cache 36, as described above relative to FIG. 1, is connected to address lines 34a and data lines 34d of program bus 34. As shown in FIG. 7, instruction cache 36 contains 64-word memory 140 which is organized into two 32-word segments 140a and 140b. Instruction cache 36 further contains segment start registers 144a and 144b, each of which stores a predetermined number of the most significant bits of the addresses for the instruction codes stored in the respective segments 140a and 140b. In the preferred embodiment of the invention, since the address signal is twenty-four bits wide, and because each of segments 140a and 140b contain thirty-two ($2^5$) bits, the number of bits stored by segment start registers 144a and 144b is nineteen. Associated with each of the thirty-two words stored in each of segments 140a and 140b is a flag bit 142 for indicating the presence of the instruction code within the corresponding word when set, and for indicating the absence of an instruction code therewithin when not set. MSB comparator 146 is connected to address lines 34a, for comparing the nineteen most significant bits on address lines 34a with the contents of the segment registers 144a and 144b. LSB decoder 148 is also connected to address lines 34a and, as will be discussed below, is for decoding the five least significant bits of the address lines 34a. Input/output buffer 150 is connected between data lines 34d and segments 140a and 140b, for controlling the output of instruction cache 36 to program bus 34. Instruction cache 36 further contains least-recently-used (LRU) stack 152 which points to segment registers 144a and 144b corresponding to the order in which they were most recently used.

In operation during a fetch cycle, where the memory address of the instruction code to be fetched does not reside in RAMs 16 or 18, or in ROM 20, but in external memory, MSB comparator 146 receives the nineteen most significant bits of the address signal on address lines 34a of program bus 34, and compares them to the contents of segment registers 144a and 144b. In the event that a match is found, LSB decoder 148 then decodes the five least significant bits of the address signal on address lines 34a, to select the one of flag bits 142 corresponding to the one of thirty-two words within either segment 140a or 140b of the full address signal on address lines 34a. If the corresponding flag bit 142 is set, input/output buffer 150 will present the contents of the corresponding word within the matched segment 140a or 140b onto data lines 34d of program bus 34, and the access of the instruction code stored in instruction cache 36 is completed. In addition, the segment register 144a or 144b which was matched is pointed to by the top of LRU stack 152, and the non-matching segment register 144a or 144b is pointed to by the bottom of LRU stack 152. The segment pointed to by the bottom of LRU stack 152 is the least recently used one of segments 140a and 140b, and will be the segment which is replaced in the event of a cache "miss", as will be explained below.

In some applications, some of the words in segments 140a and 140b may not be loaded with instruction codes. Therefore, the possibility arises that the nineteen most significant bits on address lines 34a of program bus 34 will match the contents of one of segment registers 144a and 144b, but the word within the matching one of segments 140a or 140b corresponding to the five least signficant bits will not contain an instruction code. In this event, the flag bit 142 for the corresponding word is not set (i.e., contains a "0" logic state). This is of course a cache "miss", and the instruction code for the corresponding address must be read from the addressed memory location in external memory; input/output buffer 150 will load the instruction code from data lines 34d of program bus 34 into the corresponding word within the matched segment 140a or 140b, with the corresponding flag bit 142 being set to a "1" logic state. However, since the most significant bits matched one of segment registers 144a and 144b, the matching one of segment registers 144a or 144b will be pointed to by the top of LRU stack 152, and the other one of segment registers 144a and 144b will be pointed to by the bottom of LRU stack 152.

In the event that the nineteen most significant bits on address lines 34a of program bus 34 match the contents of neither one of segment registers 144a or 144b, a cache "miss" also occurs. In this event, flag bits 142 will be reset for all words in the one of segments 140a or 140b which corresponds to the least recently used one of segments 140a and 140b, which is pointed to by the bottom of LRU stack 152. The nineteen most significant bits on address lines 34a will then be stored into the segment register 144a or 144b for the least recently used one of segments 140a or 140b, and the instruction code received from external memory on data lines 34d will be loaded into the corresponding one of the thirty two words in the "new" segment corresponding to the five least significant bits on address lines 34a, and its flag bit 142 will be set to a "1" state. The one of segment registers 140a or 140b containing the newly loaded instruction code will be pointed to by the top of LRU stack 152, with the other segment register 140a or 140b pointed to by the bottom of LRU stack 152.

Status register 71 is contained in CPU 12, as shown in FIG. 2. Three bits are contained within status register 71 which control the operation of instruction cache in a manner apart from that described above. A first bit is the cache clear bit which, when set, resets all of flag bits 142, in effecting clearing the contents of instruction cache 36. A second such control bit in status register 71 is the cache enable bit which, when set, enables operation of instruction cache 36; conversely, when the cache enable bit is not set, instruction cache 36 is disabled to the extent that it is in no way accessed, regardless of the address value on address lines 34a. During such time that the cache enable bit is not set, the contents of segment registers 144a and 144b, flag bits 142, and the words within segments 140a and 140b themselves, are not alterable. The third such bit within status register 71 is the cache freeze bit. When the cache freeze bit is set, only fetches from instruction cache 36 are allowed in the event of cache "hits". In the event of a cache "miss", however, no modification of flag bits 142, segment registers 144a and 144b, or LRU stack 152 is performed; the instruction code fetch is merely performed from external memory without affecting instruction cache 36.

Figure 8:
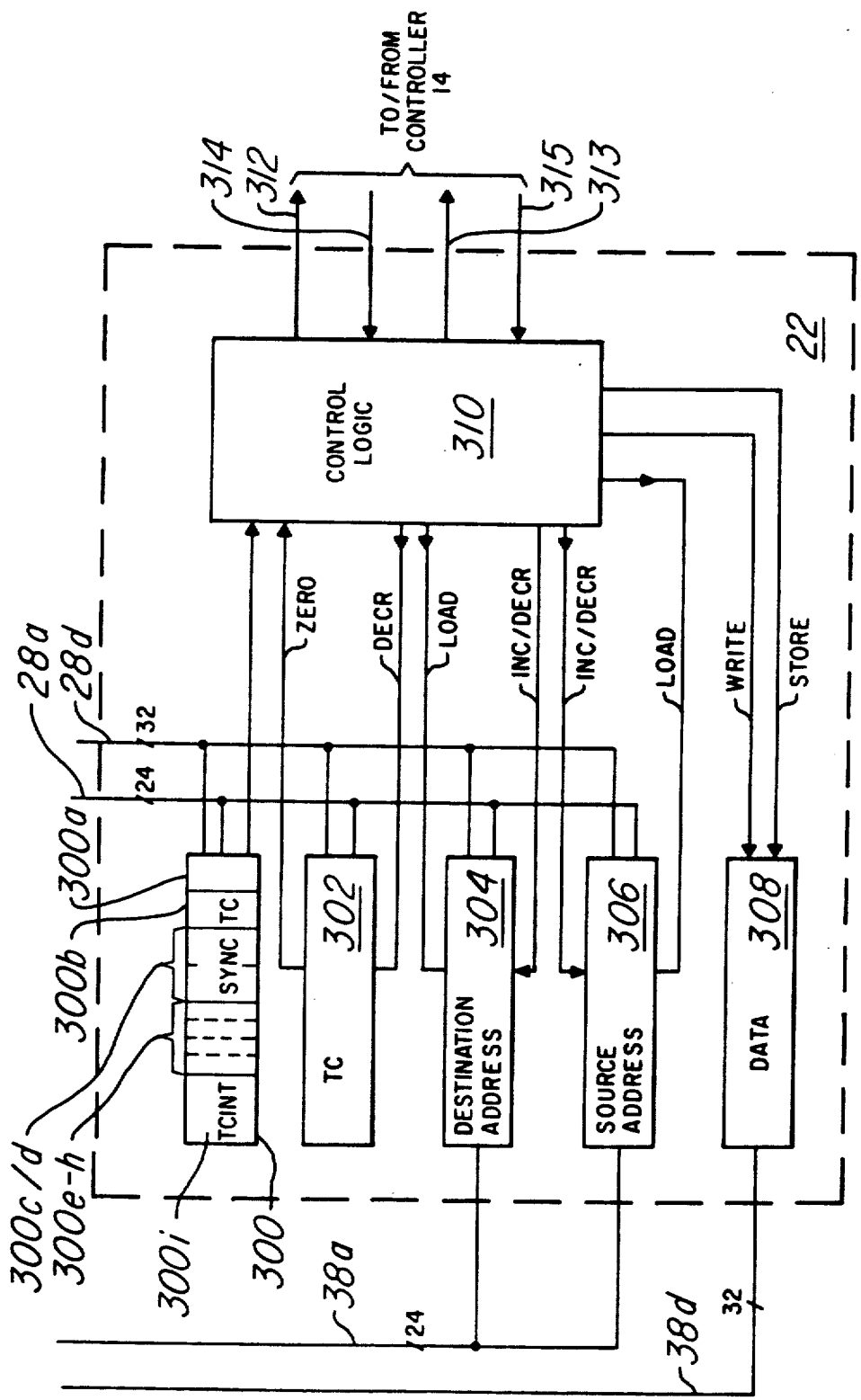
FIG. 8 is an electrical diagram, in block form, of the DMA controller of the microcomputer of FIG. 1.

Referring now to FIG. 8, the construction and operation of DMA controller 22 will be described. As is well known, direct memory access operations are useful in moving blocks of stored data from one memory area to another without intervention of the central processing unit (e.g., CPU 12). For microcomputer 10 described herein, direct memory access is also useful for moving blocks of data between external memory and on-chip memories 16 and 18. As shown in FIGS. 1 and 8, DMA controller 22 is connected to DMA bus 38 and to peripheral bus 28, for communication of data on DMA bus 28 and for receipt of control and source/destination address information from peripheral bus 28.

It should be noted that peripheral bus 28 contains address lines 28a and data lines 28d, which carry address information and data, respectively, in the same manner as data bus 30, program bus 34, and DMA bus 38 discussed heretofore. Referring back to FIG. 1, it is apparent that address lines 28a and data lines 28d of peripheral bus 28 are directly connected, and therefore correspond, to the lines I/OA$_n$ and I/OD$_n$, respectively, at the output of peripheral port 26. Accordingly, in order to present an address, or communicate data from or to, peripheral bus 28, the desired address must correspond to a value within the memory address space of microcomputer 10 which corresponds to an address serviced by peripheral port 26. The memory-mapped registers within DMA controller which are described below are therefore within the memory address space 800000$_h$ through 800FFF$_h$ referred to above in Table 4.

DMA controller 22 contains control register 300, transfer counter register 302, destination address register 304 and source address register 306, each of which are connected to address lines 28a and data lines 28d of peripheral bus 28, and each of which are mapped into unique address locations of the memory address space of microcomputer 10. DMA controller 22 further contains data register 308, which is connected to data lines 38d of DMA bus 38; address lines 38a of DMA bus are connected to destination address register 304 and source address register 306. Control logic 310 is connected to control register 300 so that the contents of the bits therein will effect the control of DMA controller 22. Control logic 310 generates a signal to transfer counter register 302 on line DECR and receives a signal from transfer counter register 302 on line ZERO. Control logic 310 provides signals to destination address register 304 and source register 306 on lines LOAD and INC-/DECR; control logic further provides signals to data register 308 on lines WRITE and STORE. To effect the desired memory read/write operations, control logic 310 generates read/write signals which are connected to controller 14, so that controller 14 can generate such control signals to memories 16, 18 and 20, and to peripheral ports 24 and 26, as discussed above relative to memory access control by controller 14.

Control register 300 is an eleven-bit addressable register which is written to in order to configure DMA controller 22. Each of the bits therein will be described along with the description of the operation hereinbelow. Transfer counter register 302 is a twenty-four bit addressable register, and which is to be loaded from peripheral bus 28 with the number of memory locations to be transferred in the DMA operation. Transfer counter register 302 is decremented by a pulse on line DECR, and sends a signal to control logic 310 on line ZERO when its contents equal zero. Source address register 306 and destination address register 304 are addressable twenty-four bit registers which store the memory addresses from and to which data are to be transferred, respectively. The contents of source address register 306 and destination address register 304 are originally loaded from the twenty-four least significant bits of data lines 28d of peripheral bus 28; depending upon the contents of control register 300, source address register 306 and destination address register 304 are incremented or decremented responsive to pulses on lines INC/DECR from control logic 310. Data register 308 is a temporary register for buffering data from data lines 38d of DMA bus 38; the value on data lines 38d are loaded into data register 308 responsive to a signal on line WRITE, and the contents of data register 308 are presented to data lines 38d responsive to a signal on line STORE.

Control logic 310 is further connected to controller 14, so that the operation of DMA controller 22 is controlled consistently with the operation of the rest of microcomputer 10. As will be evident below, the DMA can be interrupt synchronized, so that the receipt or transmission of data from external sources can be done without conflict among CPU 12, DMA controller 22, and the external source. START bit 300a of control register 300 enables and disables the operation of DMA controller 22, depending upon having a "1" or "0" logic state, respectively. TC bit 300b of control register 300 controls ready logic 310 so that, when TC bit 300b is set to a "1" state, the DMA transfer is terminated upon transfer counter register 302 reaching zero. Sync bits 300c and 300d allow configuration of the synchronization of DMA controller 22 with either the source or destination of the transferred data. The contents of bits 300e through 300h in control register 300 determine whether or not the source and destination address registers 304 and 306 are incremented, decremented, or not modified after each transfer read. TCINT bit 300i, when set to a "1" state, creates an internal interrupt when the contents of transfer counter register 302 reach zero. Control logic 310 is connected to controller 14 to generate an internal interrupt signal on line 312, and to respond to the interrupt acknowledge signal from interrupt logic 250 on line 314.

The DMA operation performed under the control of DMA controller 22 can be interrupt-driven in conjunction with controller 14, so that the operation can be externally controlled. As described above relative to controller 14, internally generated interrupts are received and handled by interrupt logic 250 in controller 14. Control logic 310 further generates an interrupt request signal to controller 14 on line 313, and receives an interrupt active signal therefrom on line 315. The interrupt request signal on line 313 indicates that DMA controller is waiting for a DMA-related interrupt generated by an external device, and the interrupt active signal on line 315 indicates that such an interrupt has been received by controller 14 and is to be serviced. Synchronization is controlled by control logic 310 generating the interrupt request signal at predetermined points in the DMA transfer cycle and waiting for the interrupt active signal before proceeding; the selection of the synchronization points is made by loading bits 300c and 300d of control register 300. Table 5 list the synchoronization modes performable by DMA controller 22.

TABLE 5

| Bits 300c/d | Interrupt synchronization |
|---|---|
| 00 | No interrupt synchronization. |
| 01 | Source synchronization; DMA read on interrupt, write when available |
| 10 | Destination synchronization; DMA read when available; write on interrupt |
| 11 | Source and destination sync; DMA read on interrupt; write on next interrupt |

In operation, transfer counter register 302, destination address register 304, and source register 306 are first loaded with the initial conditions as desired. Each of these registers 302, 304 and 306 are addressable by address lines 28a of peripheral bus 28 using a normal memory write instruction executed by microcomputer 10; implicit in FIG. 8 for each of the registers 302, 304, and 306 is decoding logic for controlling the loading of said registers 302, 304 and 306 when addressed. Control register 300 is also loaded by addressing its memory location, thereby configuring DMA controller 22 as desired. Control logic 310 is responsive to START bit 300a being set to a "1" state, enabling the operation of DMA controller 22.

By way of example, it will be assumed that control register 300 is loaded with the necessary data so that both destination address register 304 and source address register 306 will be incremented during each transfer. Also for this example, the selected synchoronization mode will be destination synchronization. According to this example, control logic 310 will first disable control logic 310 from sending internal interrupt signals to interrupt logic 250. Control logic 310 will then generate a pulse on line LOAD to source register 306, and the contents of source register 306 will be placed on address lines 38a of DMA bus 38. Consistent with the memory addressing explained above relative to FIGS. 5 and 5a, the addressed memory location (either in external memory via peripheral port 24, or in memories 16, 18 or 20) will be read. Control logic 310 will pulse the WRITE line connected to data register 308, to load the value on data lines 38d of DMA bus 38 into data register 308. After the read operation, the contents of source register 306 will be incremented by control logic 310 via line INC/DECR.

According to the destination synchronization mode selected by control register 300, control logic 310 will now generate an interrupt request signal on line 313 to interrupt logic 250. Responsive to controller 14 receiving an enabled interrupt directed to DMA, such an event communicated to DMA controller by the interrupt active signal on line 315, control logic 310 will begin the DMA write operation. Accordingly, the contents of destination register 304 will be presented upon address lines 38a of DMA bus 38 responsive to control logic 310 presenting the LOAD signal to destination address register 304. Control logic 310 will also pulse the STORE line connected to data register 308, so that the contents of data register 308 will be presented upon data lines 38d of DMA bus 38. The addressed memory location will be accessed as described before, only with controller 14 providing the necessary write control signals to effect the writing of the contents of data register 308 into the addressed location.

After completing the write, the contents of destination address register 304 will be incremented by control logic 310 via line INC/DECR and the contents of transfer counter register 302 will be decremented by control logic 310 via line DECR; if the contents of transfer counter register then reach zero, control logic 310 will receive a signal on line ZERO, and will generate (or not generate) an interrupt on line 312 depending upon the state of TCINT bit 300i of control register 300, alerting controller 14 of completion of the DMA operation. Of course, if the DMA operation does not end by way of transfer counter register 302 reaching zero or by the interrupt, control logic 310 will determine if START bit 300a of control register 300 is at a "1" state and, if so, will begin the next DMA transfer with the DMA read via source address register 306.

As is evident from this description, DMA controller 22 is thus operable to transfer the contents of a series of memory locations from the block of memory beginning with the initial source address, to a series of memory locations in a block of memory beginning with the destination address. This operation as described herein does not require the intervention of CPU 12 and, since DMA bus 38 provides a separate address and data path for DMA purposes, can allow such a DMA operation to take place simultaneously with program and data accesses in the normal operation of microcomputer 10. DMA operations can occur essentially transparent to the operation of microcomputer 10, greatly enhancing its performance.

Figure 9:
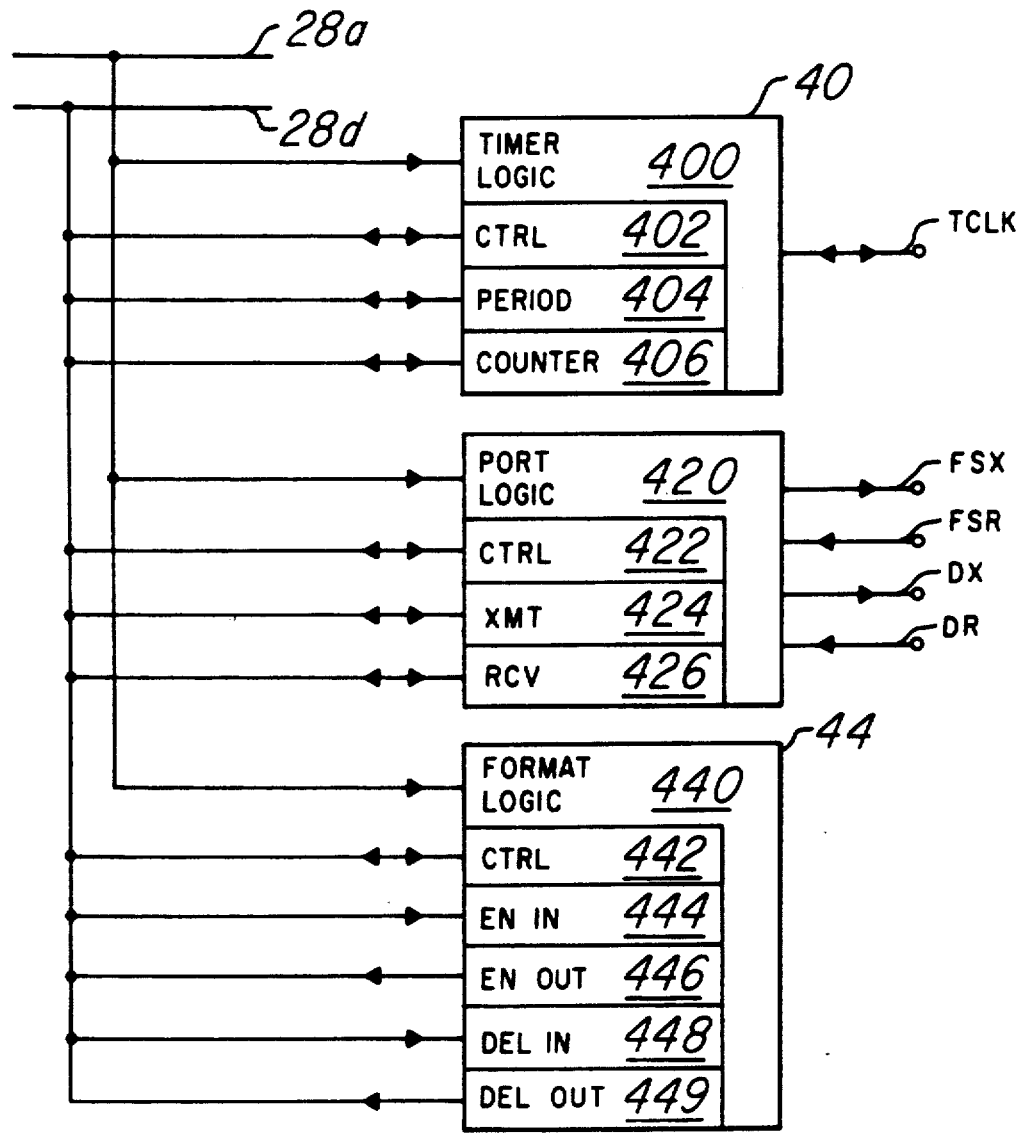
FIG. 9 is an electrical diagram, in block form, of the peripheral modules and peripheral bus of the microcomputer of FIG. 1.

Referring now to FIG. 9, the operation of peripheral bus 28, and its communication with various peripheral functions will be explained. By way of example, timer 40, serial port 42 and format converter 44 are the peripheral functions connected to microcomputer 10 described herein. These three functions provide certain communication and/or data processing functions depending upon their construction, but each of said peripheral functions communicate with peripheral bus 28, and thereby with the rest of microcomputer 10, in the same manner. Each of peripherals 40, 42, and 44 are configured and operated by microcomputer 10 by using memory mapped registers, addressable by peripheral bus 28, in the manner described below. It should be recalled that, as in the case of the memory-mapped registers contained within DMA controller 22, the memory-mapped registers contained in the peripheral functions described below reside in the input/output address space 800000$_h$ through 800FFF$_h$ referred to above relative to Table 4.

Timer 40 performs the function of measuring predetermined time periods for external control, or for internal control of microcomputer 10. Timer 40 contains timer logic 400, connected to address lines 28a of peripheral bus 28; timer logic 400 is operable to evaluate the address signal on lines 28a of peripheral bus 28, and to allow access to the various memory-mapped registers within timer 40 accordingly. Each of the registers within timer 40 (described below) are addressable by an address signal within the single address space of microcomputer 10. The memory-mapped registers within timer 40 include a control register 402 which, as is well known in the art, contains certain control information necessary to control the operation of timer 40, such as an enable/disable bit, and such as whether timer 40 is controlled by the system clock of microcomputer 10 to provide an external output, or is controlled by external clock pulses to provide an internal signal. Timer 40 further contains addressable period register 404, which is loaded from data lines 28d with the value specifying the period of time to be measured by timer 40. Counter register 406 is also contained within timer 40, and which is incremented by each pulse of either the system clock or a clock pulse received on line TCLK externally. In operation, timer logic 400 is responsive to the contents of counter register 406 equaling the contents of period register 404, at which time timer logic 400 will generate an internal interrupt signal to controller 14 if control register 402 has so chosen; if control register 402 has selected external output, timer logic 400 will generate a pulse on line TCLK when the contents of counter register 406 equal the contents of period register 404.

Serial port 42 transmits and receives data serially, as is well known in the art, but is controlled by microcomputer 10 via memory-mapped registers contained therein. Port logic 420 is contained within serial port 42, to control its operation and to allow access to the memory-mapped registers contained therein responsive to the address signals presented on address lines 28a of peripheral bus 28. An example of the construction and operation of a serial port such as serial port 42 is given in copending application Ser. No. 927,883, filed Nov. 6, 1986, and assigned to Texas Instruments Inc. Serial port 42, similarly as timer 40, continues a control register 422 which allows configuration of the serial port for certain well-known purposes, such as communication of transmit ready and receive ready signals between CPU 12 and serial port 42; such signals alert port logic 420 that CPU 12 is either ready to transmit a word of information to serial port 42 via peripheral bus 28, or ready to receive a word of information from serial port 42 via peripheral bus 28. Control register 422 further is useful to communicate control signals to and from external devices connected to serial port 42; it is of course understood that control register 422 may indeed be realized by way of a plurality of addressable registers, depending upon the number of bits necessary and if a degree of address independence among such registers is desired. Serial port 42 further contains transmit register 424 and receive register 426, which are addressable via peripheral bus 28, and which communicate the data to be transmitted or received. In operation, the rest of microcomputer 10 can address control register 422, indicating that a data word is ready for transmission by serial port 42. CPU 12 will then present the address of transmit register 424 upon address lines 28a of peripheral bus 28, and the data to be transmitted upon data lines 28d of peripheral bus 28 which is loaded into transmit register 424. Port logic 420 will then control the serial output of the contents of transmit register 424 onto serial transmit line DX, in conjunction with external control signals presented thereto such as framing signals on line FSX, as is well known in the art. Conversely, port logic 420 controls the loading of receive register 426 from line DR and generates an internal interrupt signal to interrupt logic 250 in controller 14 when receive register 426 is filled. CPU 12 then can read the contents of receive register 426 via data lines 28d of peripheral bus 28, by presenting the address associated with receive register 426 on address lines 28a of peripheral bus 28.

Format converter 44 performs the function of conversion of data from one data format to another. The encoding and decoding of data according to the well known A-law and u-law conventions is explained in said copending application Ser. No. 927,883. Format converter 44 contains format logic 440 which controls access to the memory-mapped registers contained therewithin according to the address signals on address lines 28a of peripheral bus 28, and which performs the encoding and decoding functions upon the data. Format converter 44 further contains a memory-mapped control register 442, for communication of enable/disable control bits, and of selection of the type of conversion desired, from CPU 12 to format converter 44. Format converter 44 contains two memory-mapped registers for the encoding of data, namely encode input register 444 and encode output register 446. CPU 12 provides input data to be encoded by addressing encode input register 444 by address lines 28a and accordingly writing the data to be encoded onto data lines 28d, for loading into encode input register 444. After the encoding has occurred, CPU 12 can then receive the encoded data by addressing encode output register 446 via address lines 28a, and reading the encoded data data on data lines 28d of peripheral bus 28. Conversely, the communication of decoded data is performed in a similar manner by way of decode input register 448 and decode output register 449, similarly addressable by way of peripheral bus 28.

Certain modifications to the organization of peripherals along peripheral bus 28 are of course obvious to one of ordinary skill in the art. The decoding of the address signals on lines 28a of peripheral bus 28 described above is done by each of the peripherals by the logic contained therein, i.e., by timer logic 400, port logic 420, and format logic 440. An alternative to this decoding scheme would provide a predecoder connected to address lines 28a of peripheral bus 28, which would decode the address signals presented thereupon, and communicate selection information to the individual peripherals connected along peripheral bus 28. For example, if the address on address lines 28a were directed to serial port 42, such a predecoder could enable serial port 42 and disable the other peripherals; port logic 420 could then decode less significant bits of the address signal on address lines 28a of peripheral bus 28 to select the desired memory-mapped register therein.

In addition, it should be noted that the various peripherals along peripheral bus 28 could easily be designed to communicate among one another without intervention from CPU 12 or the rest of microcomputer 10, so long as no other access on peripheral bus 28 was being attempted. An example of such communication would be for communication of data from serial port 42 to format converter 44 for encoding prior to transmission by serial port 42 to an external device. One of ordinary skill in the art would be able to provide address driving logic to the logic within these peripherals to allow one to address a register in another via address lines 28a, so that data could be communicated among the peripherals via data lines 28d.

The use of peripheral bus 28 for interconnection of the peripheral functions as described hereinabove further provides for significant flexibility in the adaptation of microcomputer 10 into different forms, merely by substitution or addition of additional peripheral functions onto peripheral bus 28. Indeed, since peripheral bus 28 corresponds and is directly connected to lines I/OA$_n$ and I/OD$_n$ at the output of peripheral port 26, and is thereby connected directly to external terminals of microcomputer 10, software which is developed for external peripheral functions may be used, with little or no modification, for a microcomputer 10 which has the same function provided on-chip and connected to peripheral bus 28. In this way, the development and debug of such new peripheral functions and features is facillitated to a great extent by the architecture described hereinabove.

Although the invention has been described in detail herein with reference to its preferred embodiment, it is to be understood that this description is by way of example only, and is not to be construed in a limiting sense. It is to be further understood that numerous changes in the details of the embodiments of the invention, and additional embodiments of the invention, will be apparent to, and may be made by, persons of ordinary skill in the art having reference to this description. It is contemplated that such changes and additional embodiments are within the spirit and true scope of the invention as claimed below.

What is claimed is:

1. A data processing device, comprising:
    a memory bus including a program bus, a data bus, and a DMA bus, each said bus for communicating and data signals;
    a memory, connected to said program bus, said data bus and said DMA bus of said memory bus, and comprising a plurality of addressable memory locations;
    an arithmetic logic unit, connected to said data bus, for executing arithmetic and logical operations on data from said data bus;
    a controller, connected to said program bus, for presenting address signals on said program bus, and for controlling the operation of said arithmetic logic unit responsive to instruction codes received by said controller responsive to said address signals presented by said controller;
    a DMA controller, connected to said DMA bus, for reading a first memory location addressable by an address corresponding to a source address, and for writing the contents of said first memory location to a second memory location, said second memory location addressable by an address corresponding to a destination address;
    an instruction cache, connected to said program bus, for storing instruction codes, and for presenting the instruction codes to said controller responsive to said address signals presented by said controller concurrently with the operation of the DMA controller; and
    a peripheral port including selection circuitry, connected to said program bus, said data bus and said DMA bus of said memory bus, for presenting address signal and for presenting and receiving data signals between external terminals of said data processing device and a selected bus among said program bus, said data bus and said DMA bus.

2. The data processing device of claim 1, wherein said memory locations in said memory have address values within a first set of addresses and said instruction cache is addressed by addresses within a second set of addresses not overlapping the first set of addresses.

3. The data processing device of claim 1 wherein said program bus includes address lines and data lines and said instruction cache comprises:
    a first instruction memory for storing instruction codes corresponding to address values, comprised of a plurality of memory locations and connected to said data lines of said program bus;
    an address register, for storing address information corresponding to the instruction codes stored in said first instruction memory; and
    an address comparator, connected to some of the address lines of said program bus, for comparing a portion of an address signal presented on said program bus to the address information in said address register;
    wherein, responsive to said address signal on said program bus corresponding to one of said instruction codes stored in said first instruction memory, said first instruction memory presents said corresponding instruction code on said program bus.

4. The data processing device of claim 3, wherein, responsive to said address signal on said program bus not corresponding to one of said instruction codes stored in said first instruction memory, said address register stores said portion of the address signal on said program bus and said first instruction memory stores an instruction code from the data lines of said program bus.

5. The data processing device of claim 3, further comprising:
    a second instruction memory, comprised of a plurality of memory locations; and
    second address register that stores further address information corresponding to instruction codes stored in said second instruction memory;
    wherein said address comparator is also for comparing said portion of the address signal presented on said program bus to the further address information in said second address register to determine whether said second instruction memory contains the addressed instruction code; and
    wherein, responsive to said address signal on said program bus corresponding to one of said instruction codes stored in said second instruction memory, said second instruction memory presents said corresponding instruction code on said program bus.

6. The data processing device of of claim 5, further comprising:
    a least-recently-used pointer, for indicating whether said first or said second instruction memory least-recently presented an instruction code to said program bus.

7. The data processing device of claim 6, wherein, responsive to said portion of the address signal on said program bus not corresponding to one of said instruction codes stored in either said first or said second instruction memory, said address register stores said portion of the address signal on said program bus and the one of said first or said second instruction memories which least-recently presented an instruction code to said program bus stores an instruction code from the data lines of said program bus.

8. A data processing device, comprising:

a memory bus including a program bus, a data bus, and a DMA bus, each said bus for communicating and data signals;

a memory, connected to said program bus, said data bus and said DMA bus of said memory bus, and comprising a plurality of addressable memory locations;

an arithmetic logic unit, connected to said data bus, for executing arithmetic and logical operations on data from said data bus;

a controller, connected to said program bus, for presenting address signals on said program bus, and for controlling the operation of said arithmetic logic unit responsive to instruction codes received by said controller responsive to said address signals presented by said controller;

a DMA controller, connected to said DMA bus, for reading a first memory location addressable by an address corresponding to a source address, and for writing the contents of said first memory location to a second memory location, said second memory location addressable by an address corresponding to a destination address;

an instruction cache, connected to said program bus, for storing instruction codes, and for presenting the instruction codes to said controller responsive to said address signals presented by said controller concurrently with the operation of the DMA controller; and wherein said memory locations in said memory have address values within a first set of addresses and said instruction cache is addressed by addresses within a second set of addresses not overlapping the first set of addresses.

9. A data processing system comprising:

a data processing device having external terminals; and an external memory connected to said data processing device at said external terminals;

said data processing device including:

a memory bus for communicating address and data signals;

a memory, connected to said memory bus, and comprising addressable memory locations within a first set of addresses, said external memory comprising addressable memory locations within a second set of addresses not overlapping the first set;

an arithmetic logic unit, connected to said memory bus, for executing arithmetic and logical operations on data from said memory bus;

a controller, connected to said memory bus, for presenting address signals on said memory bus, and for controlling the operation of said arithmetic logic unit responsive to instruction codes received by said controller responsive to said address signals presented by said controller;

a DMA bus, connected to said memory, for communicating address and data signals;

a DMA controller, connected to said DMA bus, for reading a first memory location addressable by an address corresponding to a source address, and for writing the contents of said first memory location to a second memory location, said second memory location addressable by an address corresponding to a destination address;

an instruction cache, connected to said memory bus, for storing within said device, instruction codes, and for presenting the instruction codes to said controller responsive to said address signals presented by said controller only when the address signals are within the second set of addresses; and bus selecting circuitry responsive to said controller for connecting said DMA bus to said external terminals for DMA transfers and for occasionally connecting said memory bus to said external terminals according to a predetermined priority when a cache miss occurs to obtain instruction codes from said external memory for said instruction cache, said instruction cache thereby reducing interference of instruction fetches with the DMA transfers.

10. A data processing system comprising:

a data processing device having external terminals; and an external memory connected to said data processing device at said external terminals, said data processing device including:

a memory bus including a program bus, a data bus, and a DMA bus, each said bus for communicating address and data signals;

a memory, connected to said program bus, said data bus and said DMA bus of said memory bus, and comprising a plurality of addressable memory locations;

an arithmetic logic unit, connected to said data bus, for executing arithmetic and logical operations on data from said data bus;

a controller, connected to said program bus, for presenting address signals on said program bus, and for controlling the operation of said arithmetic logic unit responsive to instruction codes received by said controller responsive to said address signals presented by said controller;

a DMA controller, connected to said DMA bus, for reading a first memory location addressable by an address corresponding to a source address, and for writing the contents of said first memory location to a second memory location, said second memory location addressable by an address corresponding to a destination address;

an instruction cache, connected to said program bus, for storing instruction codes, and for presenting the instruction codes to said controller responsive to said address signals presented by said controller concurrently with the operation of the DMA controller; and a peripheral port including bus selection circuitry, connected to said program bus, said data bus and to said DMA bus, for presenting address signals and for presenting and receiving data signals to and from said external terminals of said data processing device.

11. The data processing system of claim 10 wherein said memory locations have address values with a first set of addresses, further comprising:

memory access logic, connected to said memory, to said program bus, and to said DMA bus, for disconnecting said memory from one of said buses if the address signal presented by said program bus and the address signal presented by said DMA bus are both within said first set of addresses, said disconnected one of said buses determined according to a predetermined priority.

12. The data processing system of claim 11, wherein said memory access logic is also connected to said peripheral port, and is for disconnecting said peripheral port from one of said buses if the address signal presented by said program bus and the address signal presented by said DMA bus are both within said first set of addresses, said disconnected one of said buses determined according to a predetermined priority.

13. The data processing system of claim 11, wherein said instruction cache is addressed by addresses within a second set of addresses not overlapping said first set of addresses.

14. The data processing system of claim 10 wherein said instruction cache comprises:
- a first instruction memory for storing instruction codes corresponding to address values, comprised of a plurality of memory locations and connected to said program bus;
- an address register, for storing address information corresponding to the instruction codes stored in said first instruction memory; and
- an address comparator connected to said program bus, for comparing an address signal presented on said program bus to the address information in said address register;

wherein, responsive to said address signal on said program bus corresponding to one of said instruction codes stored in said first instruction memory, said first instruction memory presents said corresponding instruction code on said program bus.

15. The data processing system of claim 14, wherein, responsive to said address signal on said program bus not corresponding to one of said instruction codes stored in said first instruction memory, said address register stores address information of said address signal from said program bus and said first instruction memory stores the contents of a location from said external memory corresponding to said address signal.

16. The data processing system of claim 14, further comprising:
- a second instruction memory, comprised of a plurality of memory locations; and
- a second address register that stores further address information corresponding to instruction codes stored in said second instruction memory;

wherein said address comparator is also for comparing the address signal presented on said program bus to the further address information in said second address register to determine whether said second instruction memory contains the addressed instruction code; and wherein, responsive to said address signal on said program bus corresponding to one of said instruction codes stored in said second instruction memory, said second instruction memory presents said corresponding instruction code on said program bus.

17. The data processing system of claim 16, further comprising:
- a least-recently-used pointer, for indicating whether said first or said second instruction memory least-recently presented an instruction code to said program bus.

18. The data processing system of claim 17, wherein, responsive to said address signal on said program bus not corresponding to one of said instruction codes stored in either said first or said second instruction memory, said address register stores address information of said address signal from said program bus and the one of said first or said second instruction memories which least-recently presented an instruction code to said memory bus stores the contents of a location from said external memory corresponding to said address signal.

19. A data processing device, comprising:
- a semiconductor chip with bus means on-chip including a program bus, a data bus and a DMA bus, each for communicating address and data signals;
- a memory on-chip connected to said program bus, said data bus and said DMA bus and having memory locations with addresses which are fewer in number than a larger number of addresses which said bus means is capable of communicating;
- a port on-chip connectable to external memory external to said semiconductor chip, said port including a multiplexer connected to said program bus, said data bus, and said DMA bus for communicating addresses via said port so that the larger number of addresses can be utilized;
- digital circuit means on-chip connected to said data bus for fetching and processing information from said memory on-chip and for controlling which bus is selected by said multiplexer in said port;
- direct memory access (DMA) controller means on-chip connected to said DMA bus for also using said port to move information via said port between external memory and said memory on-chip; and
- an instruction cache on-chip connected to said program bus, said digital circuit means including means for also fetching and executing instruction codes from said instruction cache via said program bus thereby reducing interference by said digital circuit means to operations of said direct memory access means moving information over said DMA bus via said port.

20. The data processing device of claim 19 wherein said program bus is connected to said memory on-chip, said instruction cache, said port and said digital circuit means, and said DMA bus is connected to said memory on-chip, said direct memory access controller and said port.

21. The data processing device of claim 19 wherein the memory locations in said memory on-chip are addressed by address signals on said bus means having a value within a first set of addresses, and addresses asserted via said port to access external memory have a value within a second set of addresses, and wherein said instruction cache is addressable by addresses within the second set of addresses.

* * * * *